(12) United States Patent
Takizawa et al.

(10) Patent No.: US 8,986,859 B2
(45) Date of Patent: *Mar. 24, 2015

(54) MAGNETIC DISK SUBSTRATE, MAGNETIC DISK, AND MAGNETIC DISK DEVICE

(75) Inventors: Toshio Takizawa, Tokyo (JP); Kraisorn Phandon, Amphur Muang (TH); Kenichi Nishimori, Tokyo (JP)

(73) Assignees: Hoya Corporation, Tokyo (JP); Hoya Glass Disk (Thailand) Ltd., Lamphun (TH)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,212

(22) Filed: Jul. 9, 2012

(65) Prior Publication Data

US 2012/0276416 A1   Nov. 1, 2012

Related U.S. Application Data

(62) Division of application No. 12/527,818, filed as application No. PCT/JP2008/052710 on Feb. 19, 2008, now Pat. No. 8,241,768.

(30) Foreign Application Priority Data

Feb. 20, 2007  (JP) ................................. 2007-038926
Feb. 20, 2007  (JP) ................................. 2007-038927

(51) Int. Cl.
  *G11B 5/706*  (2006.01)
  *G11B 5/64*  (2006.01)
  (Continued)

(52) U.S. Cl.
  CPC ................ *G11B 5/7315* (2013.01); *G11B 5/82* (2013.01)
  USPC .................. 428/846.9; 428/848.1; 428/848.3; 428/848.6; 360/135

(58) Field of Classification Search
  CPC .. G11B 5/7343; G11B 5/8404; G11B 5/7315; G11B 5/82
  USPC ............... 428/846.9, 848.8, 64.2, 848.1, 848, 428/848.2, 848.3, 848.6, 64.4, 827, 836; 65/30.12, 30.14, 31.1, 111; 360/135, 360/234.7, 235.4, 235.7, 136, 319; 438/800; 29/593, 603.1; 73/104, 865.9
  See application file for complete search history.

(56) References Cited

U.S. PATENT DOCUMENTS 6,595,028 B1   7/2003   Miyamoto et al.
7,618,895 B2   11/2009   Miyahara et al.
(Continued)

FOREIGN PATENT DOCUMENTS

JP    06-274871 A    9/1994
JP    2001-041736 A   2/2001
(Continued)

OTHER PUBLICATIONS

Nippon Sheet Glass (JP 2003-242627—Machine translation), Aug. 2003.*

(Continued)

*Primary Examiner* — Kevin M. Bernatz
*Assistant Examiner* — Louis Falasco
(74) *Attorney, Agent, or Firm* — Sughrue Mion, PLLC

(57) ABSTRACT

It is an object to provide a magnetic disk substrate highly reliable to prevent the occurrence of crash failure even if a magnetic disk is rotated at high speed, and suitable for a hard disk that starts and stops by the load/unload method, and a magnetic disk using such a substrate. The representative structure of a magnetic disk substrate is a disk-shaped glass substrate 10 having a generally flat main surface 11, an end face 12, a chamfered face 13 formed between the main surface 11 and the end face 12, and an offset portion, at the periphery of the main surface 11, raised or lowered with respect to a flat surface, other than the periphery, of the main surface 11, and characterized in that the magnitude of the offset portion is approximately uniform over the entire circumference of the glass substrate 10.

9 Claims, 7 Drawing Sheets

(51) Int. Cl.
  *G11B 5/73* (2006.01)
  *G11B 5/82* (2006.01)

(56) References Cited

U.S. PATENT DOCUMENTS

| | | | |
|---|---|---|---|
| 8,241,768 B2 * | 8/2012 | Takizawa et al. | 428/848.6 |
| 2003/0172677 A1 * | 9/2003 | Miyamoto et al. | 65/30.14 |
| 2005/0217353 A1 * | 10/2005 | Ishiyama | 360/135 |
| 2006/0098343 A1 * | 5/2006 | Hattori et al. | 360/135 |
| 2006/0216551 A1 * | 9/2006 | Tanifuji et al. | 428/836 |
| 2008/0020679 A1 | 1/2008 | Usui et al. | |

FOREIGN PATENT DOCUMENTS

| | | |
|---|---|---|
| JP | 2001-167427 A | 6/2001 |
| JP | 2001-344744 A | 12/2001 |
| JP | 2003242627 A | 8/2003 |
| JP | 2005-141852 A | 6/2005 |
| JP | 2005174500 A | 6/2005 |
| JP | 2006188410 A | 7/2006 |
| WO | 2006022446 A1 | 3/2006 |

OTHER PUBLICATIONS

Singapore Office Action corresponding to Singapore Patent Application No. 200905499-0, dated Nov. 30, 2010.
Japanese Office Action issued in Application No. 2008-038819 dated Oct. 16, 2012, with an English language translation.
Japanese Office Action issued in Application No. 2008-038820 dated Oct. 16, 2012, with an English language translation.
Japanese Office Action dated Sep. 30, 2014, issued by the Japanese Patent Office in counterpart Japanese Patent Application No. 2013-253477.

* cited by examiner

Maximum Offset Values in Examples and Comparative Examples

| Measurement Angle | Example 1 | Comparative Example 1 | Example 2 | Comparative Example 3 |
|---|---|---|---|---|
| 0 | 8.57 | 19.94 | 18.05 | 10.23 |
| 30 | 8.52 | 17.99 | 18.52 | 13.52 |
| 60 | 7.50 | 18.42 | 18.32 | 18.23 |
| 90 | 6.86 | 16.60 | 17.86 | 22.64 |
| 120 | 6.75 | 17.62 | 17.52 | 22.73 |
| 150 | 7.05 | 21.34 | 16.85 | 20.52 |
| 180 | 8.60 | 22.96 | 17.36 | 15.71 |
| 210 | 7.57 | 27.67 | 17.84 | 15.65 |
| 240 | 8.47 | 32.42 | 18.21 | 20.45 |
| 270 | 9.41 | 32.52 | 18.80 | 18.27 |
| 300 | 9.61 | 25.13 | 18.41 | 14.92 |
| 330 | 9.43 | 16.42 | 18.22 | 12.58 |
| Maximum-Minimum (nm) | 2.86 | 16.10 | 1.95 | 12.50 |

MAGNETIC DISK SUBSTRATE, MAGNETIC DISK, AND MAGNETIC DISK DEVICE

This is a divisional of application Ser. No. 12/527,818, filed Aug. 19, 2009, which is a National Stage Application filed Under §371 of PCT Application No. PCT/JP2008/052710, filed Feb. 19, 2008, which claims foreign priority to JP 2007-038926, filed Feb. 20, 2007. The entire disclosures of the prior applications, application Ser. No. 12/527,818, PCT/JP2008/052710, and JP 2007-038926 are considered part of the accompanying divisional application and are hereby incorporated by reference in their entirety.

TECHNICAL FIELD

This invention relates to a magnetic disk substrate for use in a magnetic recording medium and to a magnetic disk using the same.

BACKGROUND ART

In recent years, the information recording technique, particularly the magnetic recording technique, has remarkably advanced following the development of information technology. As a magnetic recording medium, being one of magnetic recording media, to be mounted in an HDD (hard disk drive) or the like, there is a magnetic disk. The magnetic disk is formed by coating a film of NiP (nickel phosphorus) or the like on a metal substrate made of an aluminum-magnesium alloy or stacking an underlayer, a magnetic layer, a protective layer, and a lubricating layer in this order on a substrate such as a glass substrate or a ceramic substrate. Aluminum substrates have conventionally been widely used as magnetic disk substrates. However, following the reduction in size and thickness and the increase in recording density of magnetic disks, glass substrates excellent in substrate surface flatness and substrate strength as compared with the aluminum substrates have been gradually replacing them.

The glass substrates with high rigidity are also advantageous in terms that the improvement in impact resistance is also required for mounting large-capacity magnetic recording media in mobile devices and automobiles. The size of substrates tends to be reduced for installation in mobile devices. Accordingly, starting from conventional 3.5-inch substrates, there have been required 2.5-inch substrates, 1.8-inch substrates, 1-inch substrates, and smaller substrates. As the size of the substrates decreases, the allowable dimensional error also decreases and thus more accurate shape processing is required.

Further, following the increase in density of the magnetic recording technique, magnetic heads have also shifted from thin film heads to magnetoresistive heads (MR heads) and to giant magnetoresistive heads (GMR heads), wherein the flying height of a magnetic head from a substrate has decreased to even 10 nm or less. However, when the magnetic head flies over a magnetic disk with such an extremely low flying height, there is a problem that a fly stiction failure tends to occur. The fly stiction failure is a failure in which a magnetic head flying over a magnetic disk causes abnormality in flying posture or flying height, which causes irregular reproduction output changes. If this fly stiction failure occurs, there may occur a head crash failure in which the flying magnetic head is brought into contact with the magnetic disk. Therefore, the glass substrate surfaces have been required to have high-level flatness and smoothness.

Further, for effectively using the area of the surface of the glass substrate, the load/unload type (Load Unload) has started to be employed in place of the conventional CSS type (Contact Start Stop). The CSS type is a type in which a magnetic head is brought into contact with a substrate surface at the time of disk stoppage, and thus it is necessary to provide a CSS region (region for contact sliding with a magnetic head) on the substrate surface. In contrast, the load/unload type is a type in which a magnetic head is retreated to the outside of a glass substrate at the time of disk stoppage, and thus there is an advantage in that a CSS region can also be used as a recording surface. Further, during stoppage of a magnetic disk device, even if a strong impact is applied, since the magnetic head is retreated, it is possible to minimize damage to a magnetic disk. For a portable small-sized hard disk, a combination of a start reproduction system of the load/unload type and a magnetic disk using a glass substrate is selected in terms of ensuring the information recording capacity and improving the impact resistance.

In the load/unload type, since a magnetic head passes through an end portion of a glass substrate, the shape at an outer peripheral portion of the glass substrate particularly arises as a problem. If there is disturbance in shape (rising or lowering) at the outer peripheral portion of the glass substrate, the flying posture of the magnetic head is disturbed so that a contact tends to occur when the magnetic head comes in from the outside of the glass substrate or goes out, and thus there is a possibility of the occurrence of crash failure. Therefore, high flatness is required particularly at the disk outer peripheral portion.

Not only an increase in density but also an increase in speed is required for magnetic disks. Conventionally, a magnetic disk device mounted with a glass substrate has used a relatively low rotational speed of 4200 rpm or the like. In recent years, however, a rotational speed of, for example, 7200 rpm or more has started to be used. Further, in near future, a rotational speed of 10000 rmp or more is expected to be used. With such high-speed rotation, the linear velocity particularly near the outer periphery of a magnetic disk increases. For example, in a magnetic disk at a rotational speed of 4200 rpm, the linear velocity at a position of radius 32.5 mm from the substrate center is 14.3 m/sec, while, the linear velocity becomes 18.4 m/sec at 5400 rpm and the linear velocity becomes 24.5 m/sec at 7200 rpm. The above-mentioned fly stiction failure and head crash failure particularly tend to occur at the disk outer peripheral portion where the linear velocity becomes high as described above. Therefore, also in this viewpoint, high flatness is required particularly at the outer peripheral portion.

In recent years, the contact-sliding type recording medium (contact-recording type recording medium) has been re-evaluated. The contact-sliding type recording medium is a recording type in which a recording head reads and writes in a state where it is in sliding contact with a magnetic disk. Although the contact-sliding type recording medium itself is the recording type that has been present for a long time, since the recording density can be increased as the distance between a recording head and a magnetic disk is reduced, it is again considered to be the recording type that will be developed in future. As the flying height of a recording head decreases, there is a case where the recording head contacts a magnetic disk. That is, as a result of reducing the flying height of the recording head, there is a case where, partially, the recording head makes a sliding contact with the magnetic disk. However, if it makes the sliding contact, wear of the recording head becomes a big problem. Further, there is also a problem that if the recording head jumps, there is a possibility that the signal quality degrades or the recording head is damaged due to impact upon jumping or landing. These are all largely attributable to unevenness of the surface of the magnetic disk and, as the rotational speed (i.e. the linear velocity) of the magnetic disk increases, the influence increases. Therefore, also in this viewpoint, high flatness is required particularly at the outer peripheral portion.

On the other hand, as described in Patent Document 1 (JP-A-2005-141852), there has conventionally been a problem that when the main surface of a substrate is polished, the flatness of its outer peripheral portion becomes insufficient. That is, a glass substrate is polished by pressing the front and back main surfaces thereof between polishing pads and relatively moving the glass substrate and the polishing pads while supplying a slurry containing abrasives. In this event, rising (the outer peripheral portion of the main surface projects as compared with the other portion of the main surface) called ski jump occurs at the outer peripheral portion of the main surface or lowering (the outer peripheral portion of the main surface falls in a state of being shaved relatively greater than the other portion of the main surface) called roll-off occurs at the outer peripheral portion of the main surface. Either one of the ski jump and the roll-off may occur or both may occur.
Patent Document 1: JP-A-2005-141852

DISCLOSURE OF THE INVENTION

Problem to be Solved by the Invention

As described above, the outer peripheral portion of the magnetic disk is a portion where the flatness is most required because the linear velocity becomes highest and thus the influence of unevenness is large. Further, with respect to the passage of the magnetic head in the load/unload type, the flatness is also required at the outer peripheral portion of the magnetic disk. At the outer peripheral portion, the ski jump or the roll-off tends to occur and thus the flatness tends to degrade. Therefore, it is necessary to reduce the ski jump or the roll-off as much as possible or to manage so that a glass substrate with reduced ski jump or roll-off is used for a magnetic disk. And, when manufacturing a magnetic disk substrate, this end portion shape is used as one of indices for judging a good/defective product.

However, as a result of manufacturing a magnetic disk, i.e. a hard disk, using a magnetic disk substrate thus managed, there has arisen a problem of frequent occurrence of head crash.

Therefore, an attempt has been made to reduce the head crash by more strictly setting a management value for defining the above-mentioned end portion shape (more strictly setting a judgment standard for a good/defective product based on the end portion shape). As a result, the ratio of occurrence of head crash is relatively reduced, but still, there has arisen a problem of occurrence of head crash.

This invention has been made in view of the above-mentioned problems and has an object to provide a substrate highly reliable to prevent the occurrence of crash failure even if a magnetic disk is rotated at high speed, and suitable for a hard disk that starts and stops by the load/unload method, and a magnetic disk using such a substrate.

Means for Solving the Problem

As a result of diligently studying the above-mentioned problems, the inventors of this application have paid attention to the fact that there are cases where a head crash occurs and where no head crash occurs even by strictly setting the above-mentioned management value, and have observed the end portion shape of respective substrates. Then, they have found that there is variation in end portion shape in the in-plane of the glass substrate judged to have no problem in terms of the management value.

[First Mode of this Invention]

Further, the inventors of this application have found that it is possible to provide a glass substrate capable of preventing a head crash by suppressing variation in end portion shape in the in-plane of the glass substrate, more specifically, controlling the raised (lowered) shape at an end portion of a main surface of the glass substrate so as to be approximately the same in a height direction perpendicular to the main surface of the glass substrate, and have completed the first mode of this invention.

That is, a magnetic disk substrate according to the first mode of this invention has a structure in which the magnetic disk substrate is a disk-shaped substrate and has a generally flat main surface, an end face, a chamfered face formed between the main surface and the end face, and an offset portion, at a periphery of the main surface, raised or lowered with respect to a flat surface, other than the periphery, of the main surface, wherein a magnitude of offset of the offset portion is approximately uniform over the entire circumference of the substrate.

In other words, the structure is characterized in that the main surface of the substrate has, between itself and the chamfered face, the offset portion raised or lowered with respect to the main surface and, in plan view of the main surface of the substrate, the offset portion surrounds the main surface with an approximately uniform height. Herein, "an approximately uniform height" is such that, for example, the difference in height of the offset portion is preferably 5 nm or less.

According to the above-mentioned structure, it is possible to improve the flatness of particularly the outer peripheral portion of the magnetic disk substrate. Therefore, the flight posture of a magnetic head is prevented from being disturbed particularly at the outer peripheral portion of a magnetic disk and, even if the magnetic disk is rotated at high speed, there is no possibility of contact between the magnetic disk and the magnetic head and thus the reliability can be enhanced. Further, also with respect to passage of a magnetic head in the load/unload type, there is no possibility that the flight posture of the magnetic head is disturbed particularly at the outer peripheral portion of a magnetic disk or that the magnetic head is brought into contact with the magnetic disk.

That is, by causing the height of the raised shape (rising) formed at the end portion of the main surface of the substrate over the entire circumference of the substrate to be approximately the same in the circumferential direction of the substrate, when a magnetic disk device (hard disk drive: HDD) is manufactured using this substrate, it is possible to stabilize the flight of a magnetic head and thus to prevent the occurrence of head crash.

It is preferable that the magnitude of the offset be approximately uniform in the circumferential direction at arbitrary radial positions. Since a magnetic head scans a magnetic disk mainly in the circumferential direction, contact between the magnetic disk and the magnetic head can be more prevented by setting the magnitude of the offset to be approximately uniform in the circumferential direction.

When measuring the offset portion of the substrate at 12 points per 30° in the circumferential direction, the change in magnitude of the offset, i.e. the difference (change amount), in a direction perpendicular to the main surface of the substrate, in the offset portion formed along the circumference of the substrate, is preferably 5 nm or less. With the change in this range, the effect of the first mode of this invention can be obtained more reliably.

An extreme portion where rising or lowering is maximum in the offset portion is preferably located at approximately the same distance from the center of the substrate. In other words, the substrate has a circular hole in its center and it is preferable that, in the main surface, the center of a circle formed by an extreme portion where rising or lowering is maximum in the offset portion be located at approximately the same position as the center of the above-mentioned circular hole. This enables the magnitude of the offset to be approximately uniform in the circumferential direction.

In the main surface, the circularity of a circle formed by an extreme portion where rising or lowering is maximum in the offset portion is preferably 600 µm or less. If 400 µm or less, it is more preferable. Further, ideally, it is preferably 200 µm or less. If the circularity decreases (value increases), even if the magnitude of the offset of the extreme portion is uniform, the magnitude of the offset cannot be approximately uniform as seen in the circumferential direction. By setting the circularity to be within the above-mentioned range, however, the magnitude of the offset in the circumferential direction can be made approximately uniform with respect to the size of a recording head.

The substrate has a circular hole in its center and, in the main surface, the concentricity between a circle formed by an extreme portion where rising or lowering is maximum in the offset portion and the circular hole is preferably 1200 µm or less. If 1000 µm or less, it is more preferable. Further, ideally, it is preferably 800 µm or less. If the concentricity decreases (value increases), even if the offset of the extreme portion is uniform, the magnitude of the offset cannot be approximately uniform as seen in the circumferential direction. By setting the concentricity to be within the above-mentioned range, however, the magnitude of the offset in the circumferential direction can be made approximately uniform with respect to the size of a recording head.

When seen in a direction perpendicular to the main surface, the offset portion is preferably 0.02 mm+1.00 mm (width of a pico-slider of a recording head)=1.02 mm taking into account the circularity of a circle along the offset portion and the size of the recording head with respect to the disk radial direction. In other words, when seen from a section of the glass substrate, the change in position of the offset portion preferably falls within a range of 1.02 mm or less in the radial direction of the substrate.

The substrate may be a substrate for use in a magnetic disk to be mounted in a magnetic disk device of a load/unload type in which a magnetic head is loaded and unloaded with respect to a main surface of the magnetic disk through its outer periphery. Since the flatness of the outer peripheral portion is high, the substrate can be suitable for the load/unload type.

The substrate may be a substrate for use in a magnetic disk to be mounted in a magnetic disk device adapted to rotate the magnetic disk at a rotational speed of at least 5400 rpm. Since the flatness of the outer peripheral portion is high, even if the magnetic disk is rotated at high speed, there is no possibility of contact between the magnetic disk and a magnetic head and thus the reliability can be enhanced.

The representative structure of a magnetic disk manufacturing method according to the first mode of this invention is characterized by forming at least a magnetic layer on a surface of a magnetic disk substrate obtained by the above-mentioned magnetic disk substrate manufacturing method. This makes it possible to manufacture a magnetic disk having high-level flatness also at an outer peripheral portion of a main surface thereof.

[Second Mode of this Invention]

The inventors of this application have found that it is possible to provide a glass substrate capable of preventing a head crash by suppressing variation in end portion shape in the in-plane of the glass substrate, more specifically, controlling the raised shape at an end portion of a main surface of the glass substrate so as to be approximately the same in the radial direction of the glass substrate, and have completed the second mode of this invention.

That is, in order to solve the problem, a magnetic disk substrate according to the second mode of this invention has a structure in which the magnetic disk substrate is a disk-shaped substrate and has a generally flat main surface, an end face, a chamfered face formed between the main surface and the end face, and an offset portion, at a periphery of the main surface, raised with respect to a flat surface, other than the periphery, of the main surface, wherein the offset portion is formed over the entire circumference of the substrate, and an extreme portion where rising is maximum in the offset portion is located at approximately the same distance from a center of the substrate.

According to the above-mentioned structure, it is possible to improve the flatness, in the circumferential direction being a scanning direction of a recording head, particularly at the outer peripheral portion of the magnetic disk substrate. Therefore, the flight posture of the magnetic head is prevented from being disturbed particularly at the outer peripheral portion of a magnetic disk and, even if the magnetic disk is rotated at high speed, there is no possibility of contact between the magnetic disk and the magnetic head and thus the reliability can be enhanced. Further, also with respect to passage of a magnetic head in the load/unload type, there is no possibility that the flight posture of the magnetic head is disturbed particularly at the outer peripheral portion of a magnetic disk or that the magnetic head is brought into contact with the magnetic disk.

That is, by causing the radial position of the raised shape (rising) formed at the end portion of the main surface of the substrate over the entire circumference of the substrate to be approximately the same in the circumferential direction of the substrate, when a magnetic disk device (hard disk drive: HDD) is manufactured using this substrate, it is possible to stabilize the flight of a magnetic head and thus to prevent the occurrence of head crash.

In the main surface, the extreme portion of the raised offset portion is preferably located over the entire circumference of the offset portion in a range of 92.0 to 97.0% with respect to the radial distance from the center of the substrate to its outer diameter. It may alternatively be within a range of 1 to 2.6 mm from the outer peripheral end face of the substrate as a reference. This makes it possible to know the position of the extreme portion by conventional measurement of ski jump, roll-off, dub-off, or the like.

In the main surface, the circularity of a circle formed by the extreme portion is preferably 600 µm or less. If 400 µm or less, it is more preferable. Further, ideally, it is preferably 200 µm or less. If the circularity decreases (value increases), even if the magnitude of the offset of the extreme portion is uniform, the magnitude of the offset cannot be approximately uniform as seen in the circumferential direction. By setting the circularity to be within the above-mentioned range, however, the magnitude of the offset in the circumferential direction can be made approximately uniform with respect to the size of a recording head.

The substrate has a circular hole in its center and, in the main surface, the concentricity between a circle formed by the extreme portion and the circular hole is preferably 1200 μm or less. If 1000 μm or less, it is more preferable. Further, ideally, it is preferably 800 μm or less. If the concentricity decreases (value increases), even if the offset of the extreme portion is uniform, the magnitude of the offset cannot be approximately uniform as seen in the circumferential direction. By setting the concentricity to be within the above-mentioned range, however, the magnitude of the offset in the circumferential direction can be made approximately uniform with respect to the size of a recording head.

The magnitude of the offset in the offset portion may be approximately uniform over the entire circumference of the substrate. That is, the main surface of the substrate has, between itself and the chamfered face, the offset portion raised or lowered with respect to the main surface and, in plan view of the main surface of the substrate, the offset portion may surround the main surface with an approximately uniform height. It is preferable that the magnitude of the offset be approximately uniform in the circumferential direction at arbitrary radial positions. Since a magnetic head scans a magnetic disk mainly in the circumferential direction, contact between the magnetic disk and the magnetic head can be more prevented by setting the magnitude of the offset to be approximately uniform in the circumferential direction. Herein, "approximately uniform" is preferably 0.02 mm+1.00 mm (width of a pico-slider of a recording head)=1.02 mm taking into account both the circularity being in the above-mentioned range and the size of the recording head with respect to the disk radial direction.

In the offset portion, the change in magnitude of the offset, i.e. the difference (change amount), in a direction perpendicular to the main surface of the substrate, in the offset portion formed along the circumference of the substrate, is preferably 5 nm or less. With the change in this range, the effect of the second mode of this invention can be obtained more reliably.

The substrate may be a substrate for use in a magnetic disk to be mounted in a magnetic disk device of a load/unload type in which a magnetic head is loaded and unloaded with respect to a main surface of the magnetic disk through its outer periphery. Since the flatness of the outer peripheral portion is high, the substrate can be suitable for the load/unload type.

The substrate may be a substrate for use in a magnetic disk to be mounted in a magnetic disk device adapted to rotate the magnetic disk at a rotational speed of at least 5400 rpm or more. Since the flatness of the outer peripheral portion is high, even if the magnetic disk is rotated at high speed, there is no possibility of contact between the magnetic disk and a magnetic head and thus the reliability can be enhanced.

The representative structure of a magnetic disk manufacturing method according to the second mode of this invention is characterized by forming at least a magnetic layer on a surface of a magnetic disk substrate obtained by the above-mentioned magnetic disk substrate manufacturing method. This makes it possible to manufacture a magnetic disk having high-level flatness also at an outer peripheral portion of a main surface thereof.

Effect of the Invention

According to the first mode of this invention, it is possible to improve the flatness of particularly the outer peripheral portion of a magnetic disk substrate. Therefore, the flight posture of a magnetic head is prevented from being disturbed particularly at the outer peripheral portion of a magnetic disk and, even if the magnetic disk is rotated at high speed, there is no possibility of contact between the magnetic disk and the magnetic head and thus the reliability can be enhanced. Further, also with respect to passage of a magnetic head in the load/unload type, there is no possibility that the flight posture of the magnetic head is disturbed particularly at the outer peripheral portion of a magnetic disk or that the magnetic head is brought into contact with the magnetic disk.

According to the second mode of this invention, it is possible to improve the flatness, in the circumferential direction being a scanning direction of a recording head, particularly at the outer peripheral portion of a magnetic disk substrate. Therefore, the flight posture of the magnetic head is prevented from being disturbed particularly at the outer peripheral portion of a magnetic disk and, even if the magnetic disk is rotated at high speed, there is no possibility of contact between the magnetic disk and the magnetic head and thus the reliability can be enhanced. Further, also with respect to passage of a magnetic head in the load/unload type, there is no possibility that the flight posture of the magnetic head is disturbed particularly at the outer peripheral portion of a magnetic disk or that the magnetic head is brought into contact with the magnetic disk.

Figure 1:
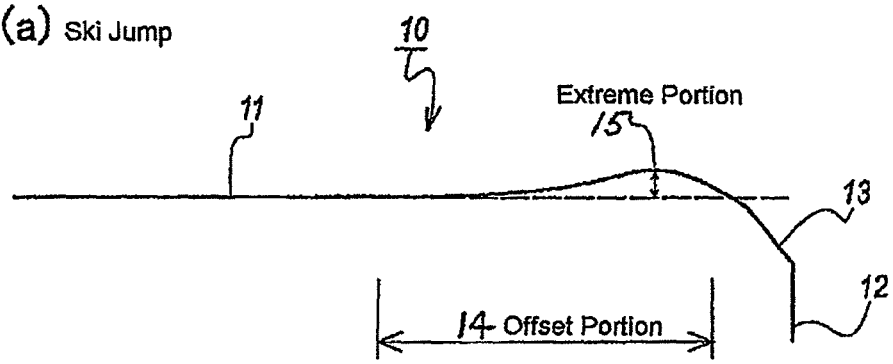
FIG. 1(a) is a diagram used for explaining a feature of this invention and is a diagram explaining the case where the end portion shape of a magnetic disk substrate is a ski-jump shape.
FIG. 1(b) is a diagram used for explaining a feature of this invention and is a diagram explaining the case where the end portion shape of a magnetic disk substrate is a roll-off shape.
Figure 1:
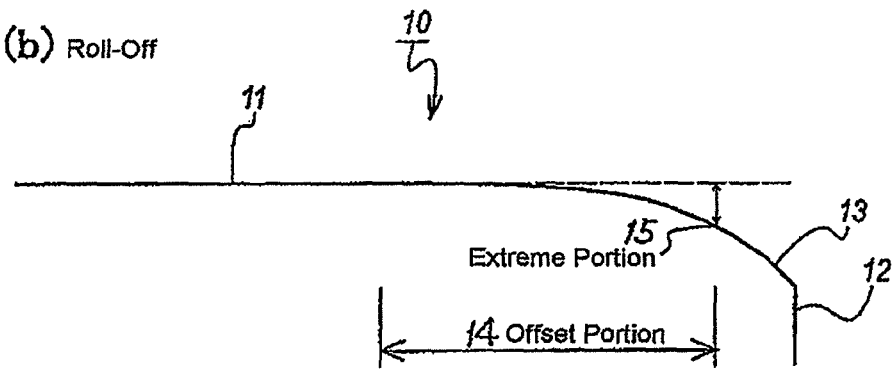

DESCRIPTION OF SYMBOLS 10 glass substrate
11 main surface
12 end face 13 chamfered face
14 offset portion
15 extreme portion

BEST MODE FOR CARRYING OUT THE INVENTION

Next, a description will be given of embodiments each of a magnetic disk substrate according to this invention and a magnetic disk using it. Sizes, materials, specific numerical values, and so on shown in the following embodiments are only illustrative for facilitating understanding of the invention and are not intended to limit this invention unless otherwise specified.

First, referring to FIGS. 1 and 2, a description will be given of an "offset portion", an "extreme portion", and so on that will be used for explaining a feature of this invention.

FIG. 1 shows side views for explaining a ski-jump shape and a roll-off shape each being one example of the end portion shape of a magnetic disk substrate.

The above-mentioned magnetic disk substrate 10 has a disk shape and is formed with a circular hole in its center. As shown in FIG. 1, the magnetic disk substrate 10 has main surfaces 11 that will serve as information recording/reproducing regions, an end face 12 perpendicular to the main surfaces 11, and chamfered faces 13 interposed between the main surfaces and the end face, respectively. Since it may happen that the boundary between the end face 12 and each chamfered face 13 becomes unclear by a later-described end face polishing process, this invention also includes a case where the end face 12 and the chamfered faces 13 on both sides thereof cooperatively form one curved surface.

Since each main surface is the region for recording/reproducing information, it is substantially flat for allowing a recording head to fly thereover. However, in the manufacture of the glass substrate 10, an offset portion 14 that is, for example, raised or lowered with respect to the main surface of the glass substrate as compared with a central portion of the main surface is formed at the periphery of the main surface. This offset portion 14 is formed on each of the inner peripheral end portion side and the outer peripheral end portion side of the main surface of the glass substrate.

As shown in FIG. 1(a), the ski-jump shape is a shape such that an outer peripheral portion of the main surface 11 is raised, while, as shown in FIG. 1(b), the roll-off shape is a shape such that an outer peripheral portion of the glass substrate 10 is lowered.

Figure 2:
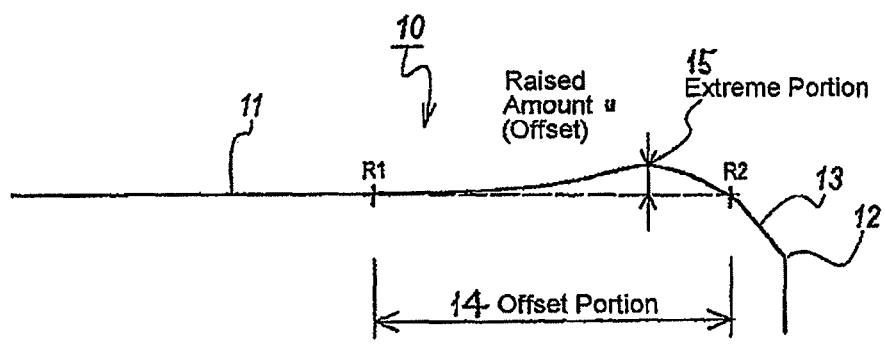
FIG. 2 is a diagram used for explaining a feature of this invention and is a diagram explaining a maximum offset value from a straight line connecting two arbitrary points in the end portion shape of a magnetic disk substrate.

FIG. 2 shows an example of performing a measurement using a maximum offset value from a straight line connecting two arbitrary points. That is, an evaluation is implemented by using the straight line connecting the two arbitrary points as a reference plane and measuring the magnitude of an extreme portion 15 (maximum offset value) being a maximum point of rising or lowering as seen from the reference plane.

As shown in FIG. 2, the maximum offset value between two points is a maximum distance in the positive direction from a straight line, connecting two arbitrary points R1 and R2, within that range. And it is possible to measure a state of the extreme portion 15 by setting the positions of the two points R1 and R2 so that the extreme portion 15 being a vertex of the ski-jump shape is included and the maximum distance from the straight line connecting the two points is located on the extreme portion 15 side.

Specifically, when setting the above-mentioned two arbitrary points R1 and R2, in the case of, for example, a substrate having an outer diameter size of 2.5 inches (outer diameter 65 mmφ), it is possible to determine the distances from the center of the glass substrate to be 29.9 mm (R1) and 31.5 mm (R2), respectively. In other words, assuming that the distance from the center of the substrate to an end face thereof is 100%, it is also possible to determine the two arbitrary points as two points at a position of 92% and a position of 97% from the center of the substrate. And the offset portion (raised portion or lowered portion) 14 of the magnetic disk substrate exists between these two points. Of these two points, the point further from the center of the substrate is a region over which a magnetic head flies.

In the embodiments described hereinbelow, rising or lowering formed with respect to the flat surface other than the periphery of the main surface at the periphery thereof as described above will be generally referred to as "offset" with respect to the flat surface of the main surface. And a portion formed with this offset will be referred to as the offset portion 14. As seen by referring to FIGS. 1 and 2, the position exhibiting the maximum offset is the extreme portion 15.

[First Embodiment]

First, the first embodiment of this invention will be described.

(Magnetic Disk Substrate)

As a result of diligent studies for reducing unevenness of a magnetic-disk main surface due to ski jump or roll-off to thereby provide a magnetic disk that can prevent the occurrence of crash failure even if rotated at high speed, the inventors have found that the state of ski jump or roll-off differs at different positions in the circumferential direction even in the same substrate, and have completed the first mode of this invention described before.

That is, also conventionally, it has been judged before shipping a glass substrate whether the glass substrate is good or not by measuring the shape of a peripheral portion. However, since glass substrates should be manufactured at low cost and in large quantities and since inspected substrates cannot be used as shipping products (destructive test), some samples are extracted from a lot and each of them is measured at only a single position thereof. And it has been found that even if magnetic disks are manufactured using the glass substrates judged to be good as a result of the measurement, there are cases where the number of glass substrates judged to be defective by a glide test is large and where the number of glass substrates judged to be defective by a glide test is small.

In view of this, the inventors have made a detailed examination and have found that when the end portion shape is measured at a plurality of positions in the circumferential direction, the position and magnitude of an extreme portion 15 differ depending on the position. It has been found that, for that reason, even in the case of a lot having passed an inspection, when a glass substrate is actually formed into a magnetic disk and incorporated into a magnetic disk device, there is a case where the desired performance cannot be exhibited. On the other hand, it has been found that when a glass substrate in which the magnitude of an extreme portion 15 formed at the periphery of a main surface of the glass substrate, in other words, the maximum value of ski jump (rising) formed at an end portion of the main surface, is approximately the same in the circumferential direction is formed into a magnetic disk and incorporated into a magnetic disk device, no head crash occurs.

Therefore, in this embodiment, the offset portion 14 formed with the offset is formed over the entire circumference of the glass substrate 10 and, further, the magnitude of the offset being a maximum value of rising or lowering in the offset portion 14 is made approximately uniform over the entire circumference of the glass substrate 10. In other words, the main surface 11 of the glass substrate 10 has, between itself and the chamfered face, the offset portion 14 raised or lowered with respect to the main surface and, in plan view of the main surface of the glass substrate, the offset portion 14 surrounds the main surface with an approximately uniform height. This will be described hereinbelow.

Next, a description will be given of a manufacturing method for manufacturing the magnetic disk substrate according to this embodiment.

A magnetic disk substrate is manufactured through various processes (details will be described later), but when manufacturing the magnetic disk substrate according to this embodiment having the extreme portion 15 being the vertex of the offset portion (raised portion or lowered portion) 14 at the peripheral portion of the main surface at approximately the same distance from the center of the glass substrate, particularly a final polishing process (second polishing process) becomes important. Whether the raised portion is formed at the peripheral portion of the main surface or whether the lowered portion lowered with respect to the flat surface is formed at the peripheral portion of the main surface is also mostly determined by the polishing conditions of the final polishing process. In the following description, the conditions for forming the raised portion will be described.

The required height of the raised portion has been much more reduced following improvement in storage density and most of factors that determine the shape/magnitude thereof depend on the polishing conditions of the final polishing process.

Many of various polishing conditions in the final polishing process affect the shape/magnitude of the raised portion, but among them, particularly the processing rate (processing speed) and the processing pressure affect them.

Hereinbelow, a description will be given of the final polishing process that polishes main surfaces of a glass substrate using a planetary gear type polishing machine. It is needless to say that the final polishing process can be carried out without using the planetary gear type polishing machine. For example, the final polishing process may be applied to the glass substrate using a single wafer type polishing machine.

In the final polishing process, the glass substrate is polished by relatively moving polishing pads and the glass substrate while pressing the polishing pads onto both main surfaces of the glass substrate. In this event, the machining amount per unit time is the processing rate and the pressure pressing the glass substrate is the processing pressure.

For manufacturing the magnetic disk substrate according to this embodiment, it is preferable that the processing rate be set in a range of 0.20 μm/min to 0.45 μm/min and the processing pressure be set in a range of 8.0 Pa to 10.5 Pa. The other polishing conditions have relatively small influences and thus are not limitative, but in the case of, for example, a 2.5-inch disk (φ65 mm), it is possible to set the hardness of the polishing pads to 85 (Asker C hardness) and the grain size of abrasives to 1.0 (μm). If polishing not satisfying the above-mentioned conditions is carried out, there is a possibility of degradation of the end portion shape or breakage of the glass substrate.

For manufacturing the magnetic disk substrate according to this embodiment, it is preferable that, after polishing the substrate at the processing pressure (main processing pressure) intended for the polishing processing, the substrate be polished at a processing pressure (e.g. 1 Pa or less) lower than the main processing pressure in the final polishing process. Particularly, it is preferable that the polishing be carried out at this low processing pressure for a time about half the polishing time of polishing the substrate at the main processing pressure. This makes it possible to reduce variation in end portion shape in the circumferential direction.

For manufacturing the magnetic disk substrate according to this embodiment, it is preferable to obtain a magnetic disk glass substrate by, after applying a chemical strengthening treatment to a glass substrate capable of being chemically strengthened, polishing main surfaces of the substrate. When the chemical strengthening treatment (ion-exchange treatment) is applied, there is a case where the end portion shape becomes rougher than that after the polishing. Thus, in terms of reducing variation in end portion shape in the circumferential direction, by applying the polishing treatment after applying the chemical strengthening treatment, it is possible to produce, at high yield, magnetic disk glass substrates with reduced variation in end portion shape in the circumferential direction. The glass substrate subjected to the main surface polishing treatment after the chemical strengthening treatment is a glass substrate having an ion-exchanged layer at at least a part of the substrate surfaces and faces, wherein the thickness of the ion-exchanged layer is greater at the end faces than at the main surfaces.

The glass substrate subjected to the main surface polishing treatment after the chemical strengthening treatment is also preferable in terms of reducing the roughness of the main surfaces. Particularly, the substrate surface roughness required for the recent perpendicular magnetic recording system has been significantly decreasing than conventional. In order to satisfy this requirement, it is preferable that the glass substrate be subjected to the main surface polishing treatment after the chemical strengthening treatment.

The surface roughness Ra of the magnetic disk substrate according to this embodiment, measured using an AFM (electron microscope), is preferably 0.15 nm or less.

For manufacturing the magnetic disk substrate according to this embodiment, when performing final polishing using a planetary gear type polishing machine, the relationship between the on-its-axis rotation speed of a carrier and the orbital rotation speed of the carrier orbiting in the machine also becomes important.

In the planetary gear type, a plurality of glass substrates are held in the carrier. Then, polishing pads are pressed onto upper and lower surfaces of the glass substrates held in the carrier. Then, in this state, the glass substrates are polished when the carrier orbits while rotating on its axis. That is, the directions of the relative movement of the glass substrates and the polishing pads are random and thus are averaged, but have no relationship at all with the circumferential direction of the glass substrates. Thus, ski jump or the like formed at the outer peripheral portion of each glass substrate has variation in radial position and magnitude at positions in the circumferential direction.

In order to reduce this variation in the circumferential direction, it is preferable to set the ratio between the on-its-axis rotation speed and the orbital rotation speed of the carrier within a range of 0.125 to 8. If polishing is performed under a condition exceeding this range, the shape of ski jump (raised portion) formed at the periphery of each glass substrate is often disturbed in the circumferential direction.

Then, if the magnitude (height) of the offset varies in the circumferential direction when seeing the glass substrate in a direction perpendicular to the main surface of the glass substrate, severe vertical changes occur when a magnetic disk rotates and a recording head (magnetic head) makes scanning, so that the flight of the recording head becomes unstable. If the recording head cannot follow the change in magnitude of the offset, a head crash occurs.

To explain this in detail, when a recording head flies over a magnetic disk, even if changes in magnitude of offset are large, if the ratio of the changes is small (gentle), the recording head can follow them. However, if there is a large offset change in a very short flight distance, a head crash occurs. That is, the magnetic disk substrate according to this embodiment is a particularly preferable mode when the head flies at high speed.

On the other hand, by setting the magnitude of the offset of the offset portion 14 to be approximately uniform over the entire circumference of the glass substrate as the above-mentioned structure, even if the ski jump or roll-off is present, as long as the recording head constantly passes over the ridge of the extreme portion 15 during scanning, it is considered that there is no height difference large enough to cause a crash failure. That is, this invention pays attention to the fact that it is the change in height of the substrate surface in the circumferential direction that is important.

Therefore, according to the structure of this embodiment, it is possible to reduce the roughness or undulation in the circumferential direction and thus to improve the flatness particularly at the outer peripheral portion of the magnetic disk substrate. Therefore, despite the ski jump or roll-off is present, the flight posture of the magnetic head is prevented from being disturbed and, even if the magnetic disk is rotated at high speed, there is no possibility of contact between the magnetic disk and the magnetic head. This makes it possible to significantly enhance the reliability when the magnetic disk is incorporated into a magnetic disk device. Further, also with respect to passage of a magnetic head in the load/unload type, since there is no possibility that the flight posture of the magnetic head is disturbed particularly at the outer peripheral portion of a magnetic disk or that the magnetic head is brought into contact with the magnetic disk, the recording head can stably pass through the end portion of the magnetic disk, which is quite preferable.

It is preferable that the magnitude of the offset be approximately uniform in the circumferential direction at arbitrary radial positions. Since a magnetic head scans a magnetic disk mainly in the circumferential direction, contact between the magnetic disk and the magnetic head can be more prevented by setting the magnitude of the offset to be approximately uniform in the circumferential direction.

Herein, "approximately uniform in the circumferential direction" is preferably 0.02 mm+1.00 mm (width of a pico-slider of a recording head)=1.02 mm taking into account the circularity being in the above-mentioned range and the size of the recording head with respect to the disk radial direction.

Specifically, for example, when measuring the offset portion 14 of the glass substrate at 12 points per 30° in the circumferential direction, the change in magnitude of the offset can be 5 nm or less. With the change in this range, the effect of this invention can be obtained more reliably.

Further, the extreme, portion 15 where rising or lowering is maximum in the offset portion 14 is preferably located at approximately the same distance from the center of the glass substrate. This is because even if the magnitude of the offset is approximately uniform over the entire circumference, if there is disturbance in distance from the center, it cannot be approximately uniform in the circumferential direction.

Specifically, in the main surface, the circularity of a circle formed by the extreme portion 15 where rising or lowering is maximum in the offset portion 14 is preferably 600 µm or less. If 400 µm or less, it is more preferable. Further, ideally, it is preferably 200 µm or less. If the circularity decreases (value increases), even if the magnitude of the offset of the extreme portion 15 is uniform, the magnitude of the offset cannot be approximately uniform as seen in the circumferential direction. In other words, when seeing a section at a predetermined radial position (position where the offset portion 14 exists) from the center of the glass substrate, if the glass substrate is rotated, the magnitude of the extreme portion 15 of the offset portion 14 (e.g. the height of the raised portion) changes. That is, if the recording head cannot follow a change in magnitude of the offset portion 14 while flying over the predetermined radial position, a head crash occurs. By setting the circularity to be within the above-mentioned range, however, the magnitude of the offset in the circumferential direction can be made approximately uniform with respect to the size of the recording head Further, the concentricity between the circular hole formed in the center of the glass substrate and the circle formed by the extreme portion 15 where rising or lowering is maximum in the offset portion 14 is preferably 1200 µm or less. If 1000 µm or less, it is more preferable. Further, ideally, it is preferably 800 µm or less. If the concentricity decreases (value increases), even if the magnitude of the offset of the extreme portion 15 is uniform, the magnitude of the offset cannot be approximately uniform as seen in the circumferential direction. By setting the concentricity to be within the above-mentioned range, however, the magnitude of the offset in the circumferential direction can be made approximately uniform with respect to the size of the recording head.

The magnetic disk substrate according to this embodiment is preferably used as a glass substrate to be mounted in a magnetic disk device adapted to rotate it at a rotational speed of 5400 rpm or more. There is, of course, no problem even if it is mounted in a magnetic disk device adapted to rotate it at a rotational speed of 5400 rpm or more, but particularly in the case of a high-rotational-speed magnetic disk device, the effect of using the magnetic disk substrate according to this embodiment remarkably appears as compared with that of using a magnetic disk substrate of other than this invention.

The magnetic disk substrate according to this embodiment is preferably used as a glass substrate to be mounted in a magnetic disk device in which a magnetic head scans an offset portion 14 present at the periphery of the glass substrate at a linear velocity of 20.0 m/sec or more.

The magnetic disk substrate according to this embodiment is preferably used for a magnetic disk with a touch-down height (TDH) of 3 to 4 nm or less. If the touch-down height is low, a crash tends to occur when the change of offset formed on the glass substrate is large. However, using the magnetic disk substrate of this embodiment, the change of an offset portion 14 can be further reduced than conventional and, thus, even if the flying height of a magnetic head (recording head) is reduced, it is possible to prevent the magnetic head from being crashed.

The magnetic disk substrate according to this embodiment is preferably used for a magnetic disk having a high recording density of 200 GBit/inch$^2$ or more and more preferably 250 GBit/inch$^2$ or more. In the case of such a high recording density, the flying height of a recording head needs to be further reduced, but since the flying height of the recording head can be further reduced by the use of the magnetic disk substrate of this embodiment, a crash can be prevented. It is needless to say that the magnetic disk substrate according to this invention can also be suitably applied to a glass substrate for use in a magnetic disk having a recording density smaller than the above or to a magnetic disk substrate for manufacturing a magnetic disk with a touch-down height greater than the above.

The magnetic disk substrate according to this embodiment is a disk-shaped magnetic disk substrate having a flat main surface, an end face, and a chamfered face interposed between the main surface and the end face, wherein, at a peripheral portion of the main surface, there exists a raised portion raised in a direction perpendicular to a flat surface, excluding the peripheral portion, of the main surface and wherein, in plan view of the main surface of the glass substrate, the raised portion surrounds the main surface and the raised portion may surround the main surface with an approximately uniform height.

In plan view of the main surface of the glass substrate, the maximum point of an offset portion 14 may be present in a range of 92.0 to 97.0% with respect to the distance to the external of the glass substrate from the center of the glass substrate as a reference.

In plan view of the main surface of the glass substrate, an extreme portion 15 of the raised portion circularly surrounds the main surface and the circularity of a circle formed by the extreme portion 15 is preferably 600 μm or less.

The glass substrate has a circular hole at its central portion and, in plan view of the main surface of the glass substrate, an extreme portion 15 of the raised portion circularly surrounds the main surface and the concentricity between a circle formed by the extreme portion 15 and a circle formed by the circular hole at the central portion is preferably 1200 μm or less.

The magnetic disk substrate according to this embodiment is a disk-shaped glass substrate having a flat main surface, an end face, and a chamfered face interposed between the main surface and the end face, wherein, in plan view of the main surface of the glass substrate, a lowered portion lowered with respect to the main surface is provided between the main surface and the chamfered face and the depth of the lowered portion from the main surface may be approximately uniform at positions spaced from the center of the glass substrate by a predetermined distance.

In the magnetic disk substrate according to this embodiment, it is preferable that at least the end face be chemically strengthened and it is more preferable that all the surfaces of the substrate be chemically strengthened. In other words, in the magnetic disk substrate, it is more preferable that a compressive stress layer be formed at the surfaces thereof. Particularly, when the magnetic disk substrate is incorporated into a magnetic disk device adapted to rotate at high-speed rotation (e.g. 10000 rpm) or into a magnetic disk device for use in a mobile application, the impact resistance is required for the glass substrate and thus it is preferable that the compressive stress layer be formed on the surfaces of the glass substrate. Herein, the chemical strengthening is a treatment for strengthening a glass substrate by bringing the glass substrate into contact with a chemical strengthening treatment solution containing a chemical strengthening salt to thereby exchange part of ions contained in the glass substrate for ions in the chemical strengthening treatment solution having an ionic radius greater than that of the former ions.

(Magnetic Disk)

Then, by forming a magnetic film on the above-mentioned magnetic disk substrate, it is possible to manufacture a magnetic disk according to this embodiment. Since the magnetic film is formed on the magnetic disk substrate, the shape of a main surface of the magnetic disk is largely affected by the glass substrate. That is, in order to improve the shape of the main surface of the magnetic disk, it is necessary to improve the shape of the main surface of the glass substrate. Therefore, using the magnetic disk substrate disclosed in this embodiment, it is possible to manufacture the magnetic disk improved particularly in shape of a peripheral portion of the main surface. Since a magnetic disk manufacturing method is known, a description thereof is omitted herein.

The magnetic disk according to this embodiment may be a magnetic disk to be mounted in a magnetic disk device of the load/unload type in which a magnetic head is loaded and unloaded with respect to the main surface through its outer periphery. Since the flatness of the outer peripheral portion of the glass substrate is high, the magnetic disk can be suitable for the load/unload type.

The magnetic disk according to this embodiment may be a magnetic disk to be mounted in a magnetic disk device adapted to rotate it at a rotational speed of at least 5400 rpm or more. Further, it can be suitably used even in a magnetic disk device with a speed of 7200 rpm or more or 10000 rpm or more. This is because since the flatness of the outer peripheral portion of the glass substrate is high, there is no possibility of contact between the magnetic disk and a magnetic head even in the case of high-speed rotation and thus the reliability is high.

The magnetic disk according to this embodiment may be a contact-sliding type recording medium (contact-recording type recording medium). In the case of the contact-sliding type recording medium, a recording head reads and writes in a state where it is in sliding contact with a magnetic disk and, therefore, by improving the flatness, in the circumferential direction, of particularly the outer peripheral portion of the magnetic disk substrate as described above, it is possible to prevent jumping of the recording head. This makes it possible to improve the signal quality and to prevent damage to the recording head.

(Magnetic Disk Device)

Then, by mounting the above-mentioned magnetic disk, it is possible to form a magnetic disk device (hard disk drive). The magnetic disk device mounted with the above-mentioned magnetic disk substrate is particularly suitable when recording/reproducing information particularly at high-speed rotation.

Although the description is being given centering on the outer peripheral end face of the magnetic disk substrate, an offset portion 14 is also formed with respect to the inner peripheral end face in the manner as described above. It is needless to say that an extreme portion 15 where rising in the offset portion 14 is maximum is preferably located at approximately the same distance from the center of the glass substrate.

(Method of Managing Manufacture of Magnetic Disk Glass Substrate)

In the foregoing description, the description has been given of the configuration in which the state of the entire offset of a glass substrate is evaluated by measuring dub-off, ski jump, or the like at a plurality of different positions on the glass substrate. However, the measurement of the dub-off, ski jump, or the like takes a long time and, currently, about five minutes are required for one position. Thus, if measuring 12 points as in the above-mentioned embodiment, one hour is required for one substrate. Since glass substrates should be mass-produced at low cost, it is preferable to omit useless measurement as much as possible.

In view of this, when actually manufacturing a magnetic disk glass substrate, variation of offset (rising or lowering) on the substrate surface may be measured only when the maximum value of the offset on the substrate surface is a predetermined value or less, thereby judging a good/defective product. More specifically, a measurement process of measuring the magnitude of offset may be divided into a position measurement process of measuring a position where offset (rising or lowering) is maximum and a value measurement process of measuring the detailed magnitude of offset. It is considered that the position measurement process is, for example, a measurement method with a resolution lower than that of the value measurement process and performs a measurement quickly and in a wide range. In this position measurement process, although the resolution is low, the magnitude of the offset can be measured with certain level accuracy. Therefore, when the magnitude of the offset clearly exceeds the range of good products, it is not necessary to carry out a detailed measurement for that substrate. On the other hand, when the magnitude of the offset falls within a range combining the range of good products and an error range of the position measurement process, 12 points may be measured in the value measurement process as in the above-mentioned embodiment.

Specifically, the position measurement process entirely scans a glass substrate using, for example, OptiFlat (manufactured by Phase Shift Technology, Inc.) as a low-resolution optical interference surface shape measuring apparatus and is capable of specifying a position where the magnitude of offset is maximum. The value measurement process can measure the detailed magnitude of offset using, for example, MicroXam (manufactured by the same company) as a high-resolution optical interference surface shape measuring apparatus.

With the configuration described above, it is possible to exclude apparently useless measurement and thus to reduce the time required for the inspection process.

Further, it may alternatively be configured that, after grasping the position where the magnitude of the offset of the glass substrate is maximum in the position measurement process, the magnitude of the offset is measured only at that position, i.e. at only the single point, in the value measurement process.

Then, in a judgment process, it is possible to judge whether the glass substrate is good or not by comparing the measured maximum magnitude of the offset with a predetermined value. When using dub-off as an offset value, the offset value is ±10 nm or less, preferably ±7 nm or less, and more preferably ±5 nm or less. The offset value measurement range can be set to a range of 92.0 to 97.0% from the center of a glass substrate assuming that the distance from the center of the glass substrate to an end portion thereof is set to 100%.

As described above, by measuring only the largest offset of the substrate, it is not necessary to perform a measurement at a plurality of positions. This makes it possible to make a quick judgment and thus to achieve a reduction in time of the inspection process.

It has been described that the substrate according to this invention is a glass (amorphous glass or glass ceramic (crystallized glass) can be used; as a material of a plate-like glass, aluminosilicate glass, sodalime glass, borosilicate glass, or the like). However, since this invention relates to the shape of a magnetic disk substrate, this invention is not limited to a material of the magnetic disk substrate and thus can be suitably applied, for example, even to a substrate made of aluminum or a material other than it. As described above, however, a glass substrate excellent in substrate surface flatness and substrate strength as compared with an aluminum substrate is preferable particularly for a mobile device.

The magnetic disk substrate according to this invention is a magnetic disk substrate having a generally flat main surface, an end face, and a chamfered face formed between the main surface and the end face and may be configured such that, at the periphery of the main surface, there is provided an offset portion 14 raised or lowered with respect to a flat surface, other than the periphery, of the main surface, the offset portion 14 is continuously formed in the circumferential direction of the main surface, and the maximum height (maximum offset value) of the offset portion 14 in a direction perpendicular to the main surface is approximately uniform over the entire circumference of the substrate.

The offset portion 14 may be formed at the outer periphery or the inner periphery of a main surface of a disk-shaped magnetic disk formed with an inner hole in its center or may be formed at each of them. In this invention, when the offset portion 14 is formed at each of the inner periphery and the outer periphery, at least one of the offset portions 14 may have the above-mentioned shape, but it is preferable that particularly the outer periphery where the linear velocity of a recording head is high have the above-mentioned shape.

By manufacturing a magnetic disk using the magnetic disk substrate of this embodiment, there can be provided the magnetic disk with small variation in touch-down height (TDH) in the radial direction of the substrate. By reducing variation in end portion shape of the substrate as described above, it is possible to improve the flying characteristics of a magnetic head near the outermost periphery of the disk.

The magnetic disk substrate according to this embodiment is preferably used as a substrate of a magnetic disk adapted for a DFH (dynamic flying height) head. In the case of using the DFH head, the distance between the surface of the magnetic disk and the closest portion of the head is much shorter than conventional. However, in the magnetic disk substrate of this embodiment, the height of undulation can be set to 20 μm or less and further to 12 μm or less. The surface roughness of the main surface of the substrate can be set to 0.15 nm or less and further to 0.12 nm or less. Thus, when the above-mentioned magnetic disk substrate is used for a magnetic disk, it is possible to further reduce a crash of a DFH head.

EXAMPLE

Hereinbelow, a description will be given of an Example about methods of manufacturing a magnetic disk substrate and a magnetic disk to which this invention is applied. These magnetic disk substrate and magnetic disk are manufactured as a magnetic disk having a predetermined shape, such as a 3.5-inch disk (φ89 mm), a 2.5-inch disk (φ65 mm), a 0.8-inch disk (φ21.6 mm), a 1.0-inch disk (φ27.4 mm), or a 1.8-inch magnetic disk (φ48 mm).

(1) Shaping Process and First Lapping Process

In the magnetic disk substrate manufacturing method according to this Example, first, lapping (grinding) is applied to surfaces of a plate-like glass to obtain a glass base member, then this glass base member is cut, thereby cutting out a glass disk. As the plate-like glass, one of various plate-like glasses can be used. This plate-like glass can be manufactured, for example, by a known manufacturing method, such as a pressing method, a float method, a downdraw method, a redrawing method, or a fusion method, using a molten glass as a material. Among them, if the pressing method is used, the plate-like glass can be manufactured at low cost. As a material property of the plate-like glass, use can be made of an amorphous glass or a glass ceramic (crystallized glass). As a material of the plate-like glass, use can be made of an aluminosilicate glass, a sodalime glass, a borosilicate glass, or the like. Particularly as the amorphous glass, the aluminosilicate glass can be preferably used in terms of capability of being chemically strengthened and capability of providing a magnetic disk substrate excellent in main surface flatness and substrate strength.

In this Example, a molten aluminosilicate glass was molded into a disk shape by direct pressing using upper, lower, and drum molds, thereby obtaining an amorphous plate-like glass. As the aluminosilicate glass, use was made of a glass for chemical strengthening which contains, as main components, $SiO_2$: 58 to 75 wt %, $Al_2O_3$: 5 to 23 wt %, $Li_2O$: 3 to 10 wt %, and $Na_2O$: 4 to 13 wt %.

Then, lapping was applied to both main surfaces of the plate-like glass, thereby obtaining a disk-shaped glass base member. The lapping was carried out using a double-side lapping machine employing a planetary gear mechanism with the use of alumina-based free abrasive grains. Specifically, the lapping was carried out by pressing lapping surface plates onto both surfaces of the plate-like glass from the upper and lower sides, supplying a grinding liquid containing the free abrasive grains onto the main surfaces of the plate-like glass, and relatively moving the plate-like glass and the surface plates to each other. By this lapping, there was obtained the glass base member having the flat main surfaces.

(2) Cutting-Out Process (Coring, Forming, Chamfering)

Then, the glass base member was cut using a diamond cutter, thereby cutting out a disk-shaped glass substrate from the glass base member. Then, using a cylindrical diamond drill, an inner hole was formed at a center portion of the glass substrate, thereby obtaining an annular glass substrate (coring). Then, grinding was applied to an inner peripheral end face and an outer peripheral end face using diamond grindstones, thereby carrying out predetermined chamfering (forming, chamfering).

(3) Second Lapping Process

Then, second lapping was applied to both main surfaces of the obtained glass substrate in the same manner as in the first lapping process. By performing this second lapping process, fine irregularities formed on the main surfaces in the cutting-out process or an end face polishing process as a preceding process can be removed in advance, so that it becomes possible to complete a subsequent main surface polishing process in a short time.

(4) End Face Polishing Process

Then, the outer and inner peripheral end faces of the glass substrate were mirror-polished by a brush polishing method. In this event, as polishing abrasive grains, use was made of a slurry (free abrasive grains) containing cerium oxide abrasive grains.

Then, the glass substrate having been subjected to the end face polishing process was washed with water. By this end face polishing process, the end faces of the glass substrate were finished to a mirror surface state that can prevent precipitation of sodium and potassium.

(5) Main Surface Polishing Process

A first polishing process was first carried out as a main surface polishing process. This first polishing process mainly aims to remove cracks or strains remaining on the main surfaces during the above-mentioned lapping processes. In this first polishing process, the main surfaces were polished using a double-side polishing machine having a planetary gear mechanism with the use of a hard resin polisher. Cerium oxide abrasive grains were used as a polishing liquid.

The glass substrate having been subjected to the first polishing process was immersed in respective cleaning baths of neutral detergent, pure water, and IPA (isopropyl alcohol) in turn so as to be cleaned.

Then, a second polishing process was carried out as a main surface polishing process. This second polishing process aims to finish the main surfaces to a mirror surface state. In this second polishing process, the main surfaces were mirror-polished using a double-side polishing machine having a planetary gear mechanism with the use of a soft resin foam polisher. As a polishing liquid, use was made of cerium oxide abrasive grains finer than the cerium oxide abrasive grains used in the first polishing process.

The glass substrate having been subjected to the second polishing process was immersed in respective cleaning baths of neutral detergent, pure water, and IPA (isopropyl alcohol) in turn so as to be cleaned. An ultrasonic wave was applied to each cleaning bath.

(6) Chemical Strengthening Process

Then, chemical strengthening was applied to the glass substrate having been subjected to the above-mentioned lapping processes and polishing processes. The chemical strengthening was carried out by preparing a chemical strengthening solution in the form of a mixture of potassium nitrate (60%) and sodium nitrate (40%), heating this chemical strengthening solution to 400° C. and preheating the cleaned glass substrate to 300° C., and immersing it in the chemical strengthening solution for about 3 hours. The immersion was carried out in a state where a plurality of glass substrates were placed in a holder so as to be held at their end faces, thereby enabling the entire surfaces of the glass substrates to be chemically strengthened.

By performing the immersion treatment in the chemical strengthening solution as described above, lithium ions and sodium ions in a surface layer of the glass substrate are replaced by sodium ions and potassium ions in the chemical strengthening solution, respectively, so that the glass substrate is strengthened. The thickness of a compressive stress layer formed at the surface layer of the glass substrate was about 100 µm to 200 µm.

The glass substrate having been subjected to the chemical strengthening treatment was immersed in a water bath at 20° C. so as to be rapidly cooled, and maintained for about 10 minutes. Then, the rapidly cooled glass substrate was immersed in concentrated sulfuric acid heated to about 40° C., so as to be cleaned. Further, the glass substrate having been subjected to the sulfuric acid cleaning was immersed in respective cleaning baths of pure water and IPA in turn so as to be cleaned.

By performing the first lapping process, the cutting-out process, the second lapping process, the end face polishing process, the first and second polishing processes, and the chemical strengthening process as described above, there was obtained a flat, smooth, and high-rigidity magnetic-disk substrate.

(7) Inspection Process

An inspection was conducted about the shape of an outer peripheral portion of the obtained magnetic disk substrate. An inspection process comprises a measurement process of measuring offset values and an extreme portion 15 at a plurality of positions in the circumferential direction of the glass substrate and a judgment process of judging whether the glass substrate is good or not based on the measured offset values and extreme portion 15.

(8) Magnetic Disk Manufacturing Process

On each of both surfaces of the glass substrate obtained through the above-mentioned processes, an adhesive layer of a Cr alloy, a soft magnetic layer of a CoTaZr-group alloy, an underlayer of Ru, a perpendicular magnetic recording layer of a CoCrPt-group alloy, a protective layer of hydrocarbon, and a lubricating layer of perfluoropolyether were formed in this order, thereby manufacturing a perpendicular magnetic recording disk. More specifically, an adhesive layer of CrTi, a soft magnetic layer of CoTaZr/Ru/CoTaZr, an intermediate layer of Ru, a granular magnetic layer of CoCrPt—$SiO_2$, and a hydrogenated carbon protective layer were formed in this order on a glass substrate using an in-line type sputtering apparatus and further a perfluoropolyether lubricating layer was formed by a dipping method, thereby obtaining a magnetic disk.

This structure is one example of the structure of a perpendicular magnetic disk (PMR: Perpendicular Magnetic Recording), while, magnetic layers and so on may be formed as a horizontal magnetic disk (LMR: Longitudinal Magnetic Recording). This makes it possible to manufacture a magnetic disk having high-level flatness also at an outer peripheral portion of a main surface thereof.

(9) Magnetic Disk Device Manufacturing Process

By incorporating the above-mentioned magnetic disk into a device, a magnetic disk device was manufactured. Since the structure of a magnetic disk device is known, a detailed description thereof is omitted herein.

Example 1

By applying the following polishing conditions to the second polishing process of (5) Main Surface Polishing Process described above, a magnetic disk substrate, a magnetic disk, and a magnetic disk device were manufactured. In this Example 1, a 2.5-inch disk (φ65 mm) was manufactured. The specific polishing conditions were such that the hardness of polishing pads was set to 85 (Asker C hardness), the grain size of abrasives to 1.0 (μm), the processing rate to 0.30 (μm/min), and the processing pressure to 9 (Pa). More specifically, the processing pressure in the final polishing process was changed in two stages so that, after performing polishing at a main processing pressure of 9 (Pa) for a predetermined time, polishing was performed at a processing pressure of 1 (Pa) for a time half the predetermined time. In this event, the product of the main processing pressure and the processing rate (main processing pressure×processing rate) was 2.7.

Comparative Example 1

A magnetic disk substrate, a magnetic disk, and a magnetic disk device according to Comparative Example 1 were manufactured by the above-mentioned manufacturing method except that the polishing conditions of the second polishing process were set to the following conditions. The specific polishing conditions in Comparative Example 1 were such that the hardness of polishing pads was set to 85 (Asker C hardness), the grain size of abrasives to 1.0 (μm), the processing rate to 0.60 (μm/min), and the processing pressure to 12.0 (Pa). In this polishing process, polishing was carried out while maintaining a main processing pressure of 12.0 (Pa) without dropping the processing pressure thereafter. In this event, the product of the main processing pressure and the processing rate (main processing pressure×processing rate) was 7.2.

Comparison between Example 1 and Comparative Example 1

The shape of an extreme portion 15 present at the periphery of a main surface of each of the magnetic disk substrates manufactured as shown in Example 1 and Comparative Example 1 was inspected by the following method.

(A) Influence of End Portion Shape

First, the influence of the height of the extreme portion 15 in the circumferential direction was examined. Specifically, in order to examine the change in height of each glass substrate in the circumferential direction, the maximum offset value of each substrate between two arbitrary points was measured. The measurement range (R1, R2 in FIG. 2) of the maximum offset value was determined so that it was possible to see the change of the extreme portion 15 formed at the periphery of the main surface of the glass substrate and having heights that differ in the circumferential direction. Herein, the distances from the center of the substrate were set to 29.9 mm (R1) and 31.5 mm (R2), respectively, and, as a measuring apparatus, use was made of an optical interference surface shape measuring apparatus (MicroXam (manufactured by Phase Shift Technology, Inc.): objective lens magnification; 2.5 times, intermediate lens magnification; 0.62 times, measurement wavelength; 553.2 nm, measurement region; 3.58× 3.88 mm, resolution; 752×480 pixels). Then, the position of the vertex was measured at 12 points in total by rotating the glass substrate per 30° in the circumferential direction.

That is, the maximum offset value measured by the above-mentioned method represents the magnitude of the offset between the above-mentioned straight line connecting R1 and R2 and the vertex (extreme portion 15) of the above-mentioned raised portion. The results are shown in FIG. 3.

Figure 3:
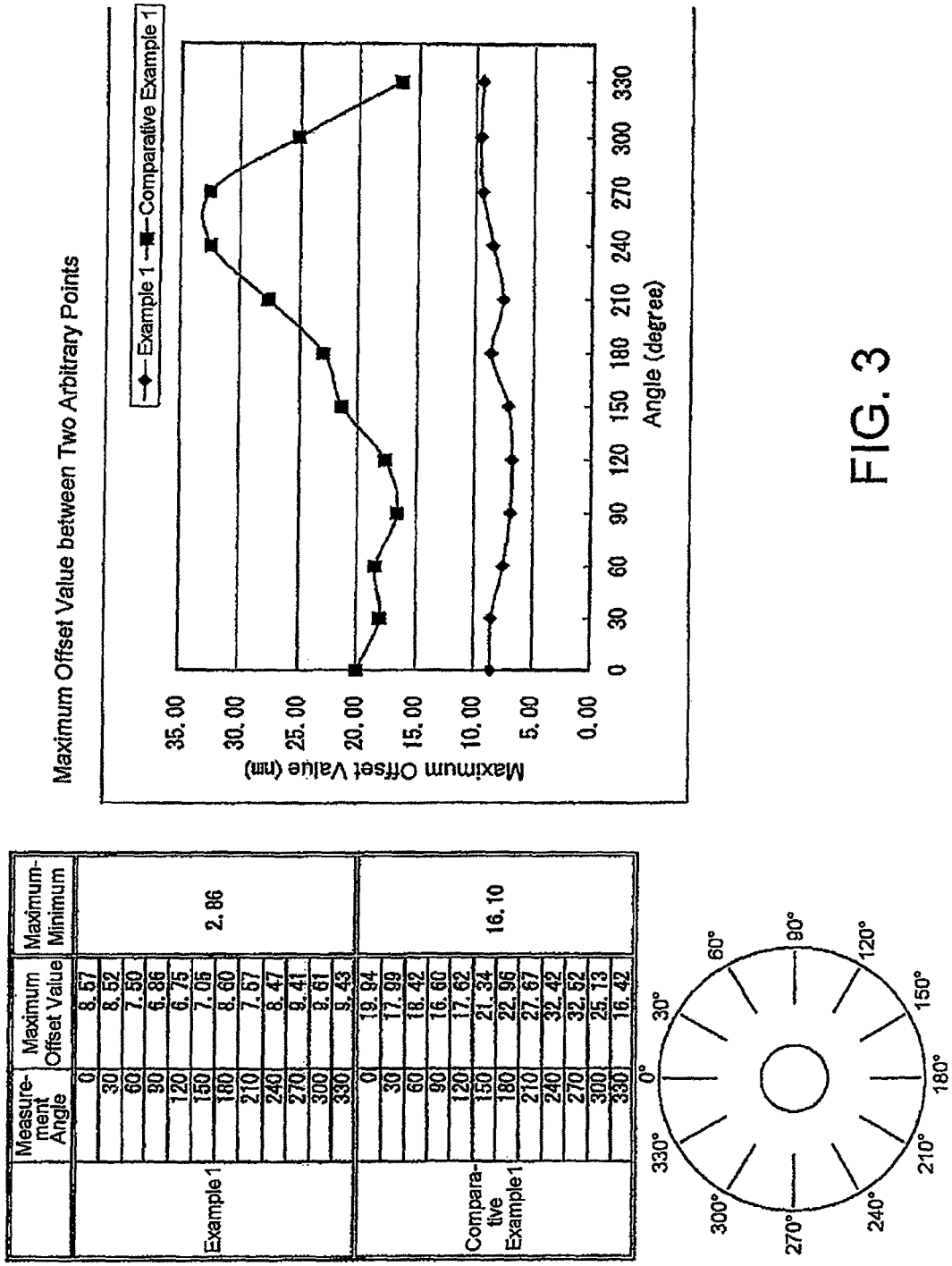
FIG. 3 is a diagram used for explaining a first embodiment of this invention and is a diagram showing the results of measuring the maximum offset value from a straight line connecting two arbitrary points in the end portion shape of a magnetic disk substrate.

As shown in FIG. 3, the change in height of the glass substrate in the circumferential direction is small in Example 1 as compared with that in Comparative Example 1. Specifically, the change difference in Example 1 was 2.86 nm, while, the change difference in Comparative Example 1 was 16.10 nm.

(B) Load/Unload Test Comparison

As described above, after manufacturing the magnetic disks in which a magnetic layer was formed on the magnetic disk substrates according to Example 1 and Comparative Example 1, the magnetic disk devices were manufactured, and a load/unload test was conducted. Specifically, the test was carried out in two cases with a disk rotational speed of 5400 rpm and 7200 rpm by setting the flying height of a recording head to 9 to 10 nm.

As a result, in the case of the magnetic disks according to Example 1 and Comparative Example 1, no crash occurred even by repeating the load/unload 1000000 times at a rotational speed of 5400 rpm. With respect to the magnetic disk of Comparative Example 1, a crash occurred in a load/unload test of 2000000 times.

On the other hand, when a load/unload test was performed by setting the rotational speed to 7200 rpm, while no crash occurred even by repeating the load/unload 1000000 times in the case of the magnetic disk according to Example 1, a crash occurred in the case of the magnetic disk according to Comparative Example 1 when the load/unload was repeated 800000 times.

From this result, it is seen to be important that, as in this invention, the magnitude of the offset of the extreme portion (vertex of the raised portion) 15 of the offset portion 14 present at the periphery of the main surface of the glass substrate be approximately uniform over the entire circumference of the glass substrate.

Although the description is being given using the vertex of the raised portion as the extreme portion 15 of the offset portion 14 in this Example, this invention can alternatively use a valley point of a lowered portion as an extreme portion 15 of an offset portion 14. That is, the same effect as above can be obtained by causing the magnitude of offset of the extreme portion 15, where lowering is maximum, to be approximately uniform over the entire circumference of a glass substrate.

(C) Specification of Surface Shape

Next, the shape (end portion shape) of the periphery of the main surface of the magnetic disk substrate was examined. An examination was made of the influence of the concentricity and circularity of positions of the extreme portion (vertex of the raised portion) 15 of the magnetic disk substrate in which the magnitude of the offset of the offset portion 14 present at the periphery of the main surface of the glass substrate is approximately uniform over the entire circumference of the glass substrate (Example 1 described above). Further, another magnetic disk substrate in which the concentricity and circularity of positions of an extreme portion (vertex of a raised portion) 15 are lower than those of the above-mentioned Example 1 was prepared as Comparative Example 2. This magnetic disk substrate of Comparative Example 2 was manufactured by setting the processing pressure and the processing rate in the final polishing process to be different from those in the above-mentioned Example 1. Specifically, the magnetic disk substrate of Comparative Example 2 was manufactured by setting the processing pressure to 8.0 (Pa) and the processing rate to 0.45 (μm/min) for the glass substrate. In this event, the product of the main processing pressure and the processing rate (main processing pressure×processing rate) was 3.6.

An optical interference surface shape measuring apparatus (OptiFlat (manufactured by Phase Shift Technology, Inc.)) was used for the measurement. OptiFlat is low in resolution but wide in measurement range as compared with MicroXam described above.

Figure 4:
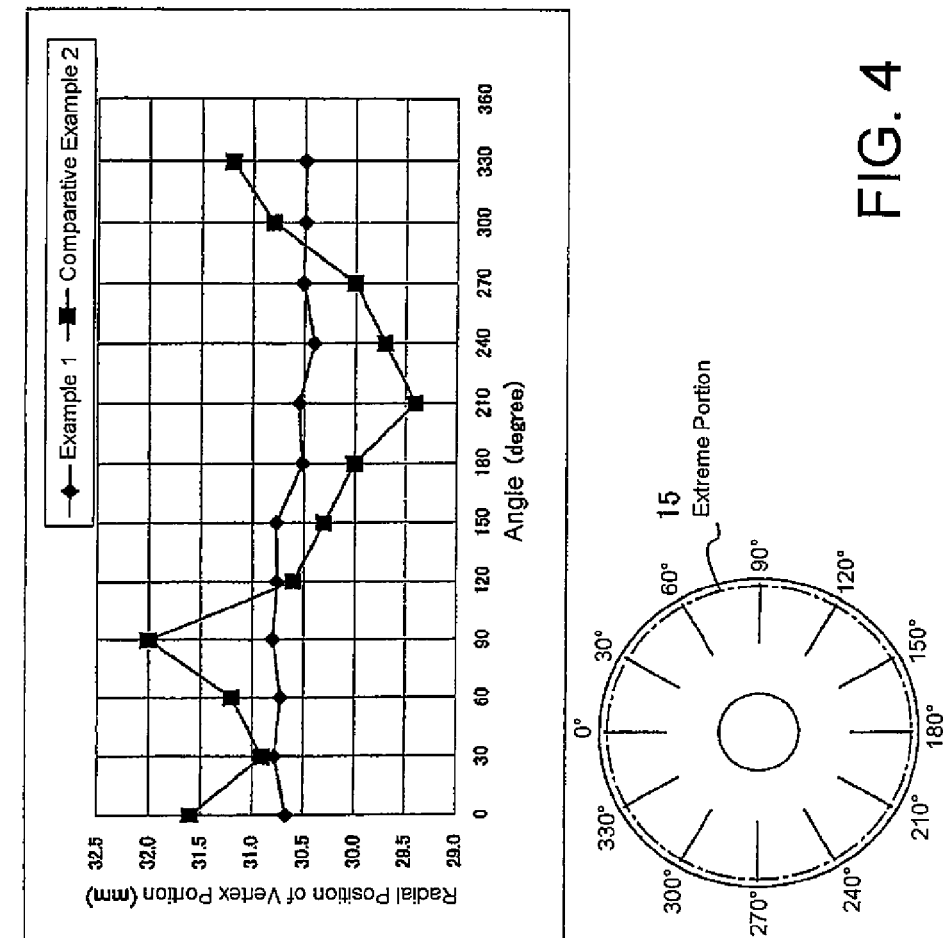
FIG. 4 is a diagram used for explaining a first embodiment of this invention and is a diagram showing the results of measuring the radial position of an extreme portion when the end portion shape of a magnetic disk substrate is a ski-jump shape.

As a result, it was found that the end portion shape of the glass substrates of Example 1 and Comparative Example 2 was a ski-jump shape. And from this measurement result, the distance of the vertex (extreme portion 15) in the ski-jump shape from the center of the glass substrate was measured. Further, in order to examine the displacement of the position of the vertex in the circumferential direction, the position of the vertex was measured at 12 points in total by rotating the glass substrate per 30° in the circumferential direction. The results in this event are shown in FIG. 4. FIG. 4 is a diagram showing the results of measuring the radial position of the extreme portion (ski-jump point) 15 of the ski jump.

As a result, as shown in FIG. 4, it was found that the extreme portion 15 formed at the periphery of the main surface of the magnetic disk substrate according to Example 1 was located at approximately the same position (distance) as seen from the center of the glass substrate and, specifically, was located in a range of ±0.2 mm with respect to 30.6 mm from the center of the glass substrate. On the other hand, in the case of Comparative Example 2, it was found that the extreme portion 15 was located in a range of ±1.4 mm with respect to 30.6 mm.

The circularity of the magnetic disk substrate according to Example 1 was 0.40 (mm) and the concentricity thereof was 1.07 (mm). On the other hand, the circularity of the magnetic disk substrate according to Comparative Example 2 was 2.60 (mm) and the concentricity thereof was 5.68 (mm). With respect to the height (offset value) of the extreme portion 15, the values were approximately the same in the structures of Example 1 and Comparative Example 2.

Then, for the above-mentioned Example 1 and Comparative Example 2, a load/unload test was conducted in which the rotational speed was set to 10000 rpm. This test was carried out in a state of a magnetic disk. In this event, the flying height of a recording head was set to 9 to 10 nm. As a result, no crash occurred even by repeating the load/unload 1000000 times in the case of Example 1, while, in the case of Comparative Example 2, a crash occurred when the load/unload was repeated 600000 times. In Example 1, in the case of a rotational speed of 5400 rpm and 7200 rpm, no crash occurred even by repeating the load/unload 1000000 times.

Further, despite the offset values in the magnetic disk substrates were approximately the same in Example 1 and Comparative Example 2, a crash failure occurred with the structure of Comparative Example 2 when a glide test was carried out at high-speed rotation. On the other hand, no crash failure occurred with the structure of Example 1. This is presumably because even if large (not small) ski jump is present, since the circularity or concentricity is high (value is small), the change (roughness or undulation) of the substrate surface in the circumferential direction is small. Further, as a result of many tests, it was found that the circularity was preferably 600 μm or less and the concentricity was preferably 1200 μm or less.

From this result, it is seen to be most preferable in terms of rotating the magnetic disk at high speed that the extreme portion 15 be the same in radial position and small in height change in the circumferential direction of the glass substrate.

(D) Modulation Test

A modulation test was conducted for the magnetic disks obtained in Example 1 and Comparative Example 1. Specifically, a modulation was measured in a region between distances of 29.9 mm (R1) and 31.5 mm (R2) from the center of the 2.5-inch (outer diameter 65 mmϕ) glass substrate.

Specific measurement conditions followed the following sequence (1) to (3).

(1) Set a magnetic disk in an electromagnetic conversion characteristic measuring apparatus (Guzik Technical Enterprise) and, after loading a magnetic head (DFH (dynamic flying height) head) on the magnetic disk, write a MF pattern (frequency half a high frequency used for a hard disk).

(2) Input a read signal into an oscilloscope.

(3) Derive a modulation per sector at an arbitrary radial position within the above-mentioned range.

As a result, in comparison between Example 1 and Comparative Example 1, modulation values were better in Example 1.

Further, the same modulation test as above was conducted using magnetic disk substrates having the same variation in maximum offset value as Example 1 (substrate in which the height of a raised portion is uniform in the circumferential direction), but having different circularity and concentricity from each other. As a result, modulation values were excellent for those in which the circularity was 1200 μm or less and the concentricity was 600 μm or less, while, if the circularity and concentricity deviate from these values, the modulation results were degraded. In Example 1 and Comparative Example 1, the magnetic disks were manufactured under the same conditions.

Example 2

Figure 5:
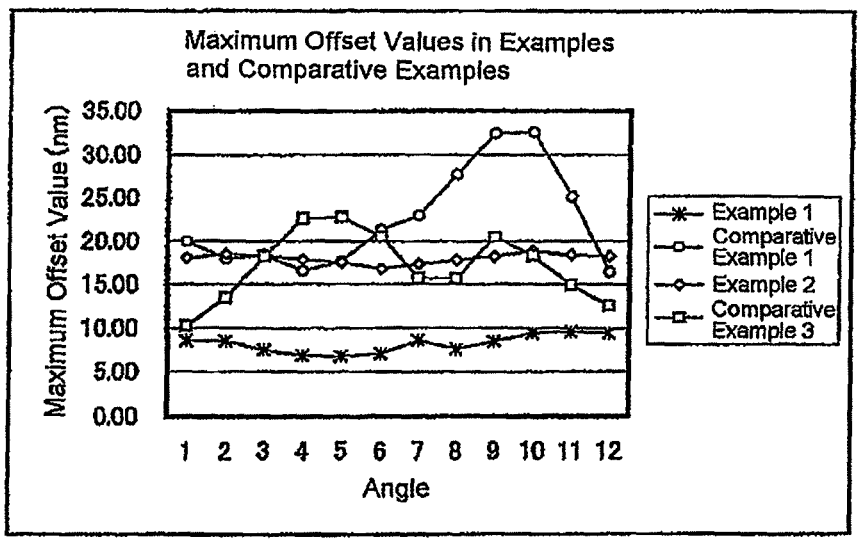
FIG. 5 is a diagram used for explaining a first embodiment of this invention and is a diagram showing the results of measuring the maximum offset value from a straight line connecting two arbitrary points in the end portion shape of a magnetic disk substrate.

FIG. 5 is a diagram showing the results of measuring the maximum offset value from a straight line connecting two arbitrary points with respect to Example 2 and Comparative Example 3. In Example 2, the processing was performed under the same conditions as in the above-mentioned Example 1 and, in Comparative Example 3, the processing was performed under the same conditions as in the above-mentioned Comparative Example 1. For comparison, FIG. 5 further shows Example 1 and Comparative Example 1. Like the results shown in FIG. 3, the position of the vertex (extreme portion 15) in a ski-jump shape was measured at 12 points in total by rotating a glass substrate per 30° in the circumferential direction.

As shown in FIG. 5, in Example 2, the maximum offset values are higher on the whole than those in Example 1, but the change (maximum-minimum) in height in the circumferential direction of the glass substrate was still smaller than that in Example 1. On the other hand, in Comparative Example 3, the change was smaller than that in Comparative Example 1, but as seen from a graph, the maximum offset values irregularly go up and down. In general, the change differences in Example 1 and Example 2 were as small as 2.86 nm and 1.95 nm, respectively, while, the change differences in Comparative Example 1 and Comparative Example 3 were as large as 16.10 nm and 12.50 nm, respectively.

The above-mentioned Examples and Comparative Examples relate to the case where the end portion shape is a ski-jump shape (shape raised with respect to the main surface). Also in the case of a roll-off shape being a shape lowered with respect to the substrate main surface, the same results as those of the above-mentioned Examples and Comparative Examples were obtained as a result of carrying out the same tests.

While the first preferred embodiment of this invention has been described with reference to the accompanying drawings, it is needless to say that this invention is not limited thereto. It is obvious that a person skilled in the art can think of various modified examples or revised examples within the scope described in claims and it is understood that those naturally also belong to the technical scope of this invention.

[Second Embodiment]

Next, the second embodiment of this invention will be described.

(Magnetic Disk Substrate)

As a result of diligent studies for reducing unevenness of a magnetic-disk main surface due to ski jump or roll-off to thereby provide a magnetic disk that can prevent the occurrence of crash failure even if rotated at high speed, the inventors have found that the state of ski jump or roll-off differs at different positions in the circumferential direction even in the same substrate, and have also completed the second mode of this invention described before.

That is, also conventionally, it has been judged before shipping a glass substrate whether the glass substrate is good or not by measuring the shape of a peripheral portion. However, since glass substrates should be manufactured at low cost and in large quantities and since inspected substrates cannot be used as shipping products (destructive test), some samples are extracted from a lot and each of them is measured at only a single position thereof. And it has been found that even if magnetic disks are manufactured using the glass substrates judged to be good as a result of the measurement, there are cases where the number of glass substrates judged to be defective by a glide test is large and where the number of glass substrates judged to be defective by a glide test is small.

In view of this, the inventors have made a detailed examination and have found that when the end portion shape is measured at a plurality of positions in the circumferential direction, the position and magnitude of an extreme portion 15 differ depending on the position. It has been found that, for that reason, even in the case of a lot having passed an inspection, when a glass substrate is actually formed into a magnetic disk and incorporated into a magnetic disk device, there is a case where the desired performance cannot be exhibited. On the other hand, it has been found that when a glass substrate in which the radial position of an extreme portion formed at the periphery of a main surface of the glass substrate, in other words, the radial position where the maximum value of ski jump (rising) formed at an end portion of the main surface exists, is approximately the same in the circumferential direction is formed into a magnetic disk and incorporated into a magnetic disk device, no head crash occurs.

Therefore, in this embodiment, it is configured that the offset portion 14 formed with the offset is formed over the entire circumference of the glass substrate 10 and, further, the extreme portion 15 where rising is maximum in the offset portion 14 is located at approximately the same distance from the center of the glass substrate. This will be described hereinbelow.

Next, a description will be given of a manufacturing method for manufacturing the magnetic disk substrate according to this embodiment.

A magnetic disk substrate is manufactured through various processes (details will be described later), but when manufacturing the magnetic disk substrate according to this embodiment having the extreme portion being the vertex of the offset portion (raised portion or lowered portion) 14 at the peripheral portion of the main surface at approximately the same distance from the center of the glass substrate, particularly a final polishing process (second polishing process) becomes important. Whether the raised portion is formed at the peripheral portion of the main surface or whether the lowered portion lowered with respect to the flat surface is formed at the peripheral portion of the main surface is also mostly determined by the polishing conditions of the final polishing process. In the following description, the conditions for forming the raised portion will be described.

The required height of the raised portion has been much more reduced following improvement in storage density and most of factors that determine the shape/magnitude thereof depend on the polishing conditions of the final polishing process.

Many of various polishing conditions in the final polishing process affect the shape/magnitude of the raised portion, but among them, particularly the processing rate (processing speed) and the processing pressure affect them.

Hereinbelow, a description will be given of the final polishing process that polishes main surfaces of a glass substrate using a planetary gear type polishing machine. It is needless to say that the final polishing process can be carried out without using the planetary gear type polishing machine. For example, the final polishing process may be applied to the glass substrate using a single wafer type polishing machine.

In the final polishing process, the glass substrate is polished by relatively moving polishing pads and the glass substrate while pressing the polishing pads onto both main surfaces of the glass substrate. In this event, the machining amount per unit time is the processing rate and the pressure pressing the glass substrate is the processing pressure.

For manufacturing the magnetic disk substrate according to this embodiment, it is preferable that the processing rate be set in a range of 0.25 to 0.5 μm/min and the processing pressure be set in a range of 8.5 to 11 Pa. The other polishing conditions have relatively small influences and thus are not limitative, but in the case of, for example, a 2.5-inch disk (φ65 mm), it is possible to set the hardness of the polishing pads to 85 (Asker C hardness) and the grain size of abrasives to 1.0 (μm). If polishing not satisfying the above-mentioned conditions is carried out, there is a possibility of degradation of the end portion shape or breakage of the glass substrate.

For manufacturing the magnetic disk substrate according to this embodiment, when performing final polishing using a planetary gear type polishing machine, the relationship between the on-its-axis rotation speed of a carrier and the orbital rotation speed of the carrier orbiting in the machine also becomes important.

In the planetary gear type, a plurality of glass substrates are held in the carrier. Then, polishing pads are pressed onto upper and lower surfaces of the glass substrates held in the carrier. Then, in this state, the glass substrates are polished when the carrier orbits while rotating on its axis. That is, the directions of the relative movement of the glass substrates and the polishing pads are random and thus are averaged, but have no relationship at all with the circumferential direction of the glass substrates. Thus, ski jump or the like formed at the outer peripheral portion of each glass substrate has variation in radial position and magnitude at positions in the circumferential direction.

In order to reduce this variation in the circumferential direction, it is preferable to set the ratio between the on-its-axis rotation speed and the orbital rotation speed of the carrier within a range of 0.125 to 8. If polishing is performed under a condition exceeding this range, the shape of ski jump (raised portion) formed at the periphery of each glass substrate is often disturbed in the circumferential direction.

Then, if the radial position where the extreme portion is formed varies in the circumferential direction when seeing the glass substrate in a direction perpendicular to the main surface of the glass substrate, specifically, for example, if a circle formed by a line connecting portions of the extreme portion becomes eccentric or elliptic or meanders, severe vertical changes occur when the circumferential direction (track direction) in which a recording head (magnetic head) makes scanning crosses a locus formed by portions of the extreme portion. In other words, when the recording head scans a magnetic disk rotating at high speed, the recording head passes across a plurality of extreme portions and thus the flight of the recording head becomes unstable.

Following the reduction in flying height of recording heads in recent years, there is a possibility that the recording head cannot follow such vertical changes, leading to the occurrence of crash failure. Further, in the case of a contact-sliding type hard disk, there is a possibility that a recording head jumps to cause degradation of the signal quality or damage to the recording head.

On the other hand, by causing the extreme portion to be located at approximately the same distance from the center of the glass substrate as the above-mentioned structure, even if the ski jump or roll-off is present, as long as the recording head constantly passes over the ridge of the extreme portion during scanning, it is considered that there is no height difference large enough to cause a crash failure. It is, of course, expected that the extreme portion itself has a height difference depending on the position in the circumferential direction, but this height difference is far smaller than rising or lowering of the extreme portion due to meandering or the like. That is, this invention pays attention to the fact that it is the change in height of the substrate surface in the circumferential direction that is important.

Therefore, according to the structure of this embodiment, it is possible to reduce the roughness or undulation in the circumferential direction and thus to improve the flatness particularly at the outer peripheral portion of the magnetic disk substrate. Therefore, despite the ski jump or roll-off is present, the flight posture of the magnetic head is prevented from being disturbed and, even if the magnetic disk is rotated at high speed, there is no possibility of contact between the magnetic disk and the magnetic head. This makes it possible to significantly enhance the reliability when the magnetic disk is incorporated into a magnetic disk device. Further, also with respect to passage of a magnetic head in the load/unload type, since there is no possibility that the flight posture of the magnetic head is disturbed particularly at the outer peripheral portion of a magnetic disk or that the magnetic head is brought into contact with the magnetic disk, the recording head can stably pass through the end portion of the magnetic disk, which is quite preferable.

Specifically, in the main surface, the circularity of a circle formed by the extreme portion where rising or lowering is maximum in the offset portion 14 is preferably 600 μm or less. If 400 μm or less, it is more preferable. Further, ideally, it is preferably 200 μm. If the circularity decreases (value increases), even if the magnitude of the offset of the extreme portion is uniform, the magnitude of the offset cannot be approximately uniform as seen in the circumferential direction. In other words, when seeing a section at a predetermined radial position (position where the offset portion 14 exists) from the center of the glass substrate, if the glass substrate is rotated, the magnitude of the extreme portion of the offset portion 14 (e.g. the height of the raised portion) changes. That is, if the recording head cannot follow a change in magnitude of the offset portion 14 while flying over the predetermined radial position, a head crash occurs. By setting the circularity to be within the above-mentioned range, however, the offset value in the circumferential direction can be made approximately uniform with respect to the size of the recording head.

Further, the concentricity between the circular hole formed in the center of the glass substrate and the circle formed by the extreme portion where rising or lowering is maximum in the offset portion 14 is preferably 1200 μm or less. If 1000 μm or less, it is more preferable. Further, ideally, it is preferably 800 μm or less. If the concentricity decreases (value increases), even if the magnitude of the offset of the extreme portion is uniform, the magnitude of the offset cannot be approximately uniform as seen in the circumferential direction. By setting the concentricity to be within the above-mentioned range, however, the magnitude of the offset in the circumferential direction can be made approximately uniform with respect to the size of the recording head.

Further, it is preferable that the magnitude of the offset be approximately uniform in the circumferential direction at arbitrary radial positions. By causing the circumferential direction to coincide with the locus described by the extreme portion and by causing the magnitude of the offset of the extreme portion to be approximately uniform, contact between the magnetic disk and the magnetic head can be more prevented. Herein, "approximately uniform" is preferably 0.02 mm+1.00 mm (width of a pico-slider of a recording head)=1.02 mm taking into account both the circularity being in the above-mentioned range and the size of the recording head with respect to the disk radial direction.

Specifically, for example, when measuring the offset portion 14 of the magnetic disk substrate at 12 points per 30° in the circumferential direction, the change in magnitude of the offset can be 5 nm or less. With the change in this range, the effect of this invention can be obtained more reliably.

As described above, if the recording head cannot follow the change in magnitude of the offset, a head crash occurs. To explain this in detail, when a recording head flies over a magnetic disk, even if changes in magnitude of offset are large, if the ratio of the changes is small (gentle), the recording head can follow them. However, if there is a large offset change in a very short flight distance, a head crash occurs. That is, the magnetic disk substrate according to this embodiment is a particularly preferable mode when the head flies at high speed. More specifically, the magnetic disk substrate according to this embodiment is preferably used as a glass substrate to be mounted in a magnetic disk device adapted to rotate it at a rotational speed of 5400 rpm or more. There is, of course, no problem even if it is mounted in a magnetic disk device adapted to rotate it at a rotational speed of 5400 rpm or more, but particularly in the case of a high-rotational-speed magnetic disk device, the effect of using the magnetic disk substrate according to this embodiment remarkably appears as compared with that of using a magnetic disk substrate of other than this invention.

The magnetic disk substrate according to this embodiment is preferably used as a glass substrate to be mounted in a magnetic disk device in which a magnetic head scans an offset portion 14 present at the periphery of the glass substrate at a linear velocity of 20.0 m/sec or more.

The magnetic disk substrate according to this embodiment is preferably used for a magnetic disk with a touch-down height (TDH) of 3 to 4 nm or less. If the touch-down height is low, a crash tends to occur when the change of offset formed on the glass substrate is large. However, using the magnetic disk substrate of this embodiment, the change of an offset portion 14 can be further reduced than conventional and, thus, even if the flying height of a magnetic head (recording head) is reduced, it is possible to prevent the magnetic head from being crashed.

The magnetic disk substrate according to this embodiment is preferably used for a magnetic disk having a high recording density of 200 GBit/inch$^2$ or more and more preferably 250 GBit/inch$^2$ or more. In the case of such a high recording density, the flying height of a recording head can be further reduced and thus a crash can be prevented by the use of the magnetic disk substrate of this embodiment. It is needless to say that the magnetic disk substrate according to this invention can also be suitably applied to a glass substrate for use in a magnetic disk having a recording density smaller than the above or to a magnetic disk substrate for manufacturing a magnetic disk with a touch-down height greater than the above.

The magnetic disk substrate according to this embodiment is a disk-shaped magnetic disk substrate having a flat main surface, an end face, and a chamfered face interposed between the main surface and the end face, wherein, at a peripheral portion of the main surface, there exists an offset portion 14 offset in a direction perpendicular to a flat surface, excluding the peripheral portion, of the main surface and wherein, in plan view of the main surface of the glass substrate, a maximum point (extreme portion 15), where the degree of offset is maximum, of the offset portion 14 may be located at positions with approximately the same distance from a central portion of the glass substrate.

In plan view of the main surface of the glass substrate, the maximum point of the offset portion 14 may be present in a range of 92.0 to 97.0% with respect to the distance to the external of the glass substrate from the center of the glass substrate as a reference.

In plan view of the main surface of the glass substrate, the extreme portion 15 of the raised portion circularly surrounds the main surface and the circularity of a circle formed by the extreme portion 15 is preferably 600 μm or less.

The glass substrate has a circular hole at its central portion and, in plan view of the main surface of the glass substrate, the extreme portion 15 of the raised portion circularly surrounds the main surface and the concentricity between a circle formed by the extreme portion 15 and a circle formed by the circular hole at the central portion is preferably 1200 μm or less.

The magnetic disk substrate according to this embodiment is a disk-shaped glass substrate having a flat main surface, an end face, and a chamfered face interposed between the main surface and the end face, wherein, in plan view of the main surface of the glass substrate, a lowered portion lowered with respect to the main surface is provided between the main surface and the chamfered face and the depth of the lowered portion from the main surface may be approximately uniform at positions spaced from the center of the glass substrate by a predetermined distance.

In the magnetic disk substrate according to this embodiment, it is preferable that at least the end face be chemically strengthened and it is more preferable that all the surfaces of the substrate be chemically strengthened. In other words, in the magnetic disk substrate, it is more preferable that a compressive stress layer be formed at the surfaces thereof. Particularly, when the magnetic disk substrate is incorporated into a magnetic disk device adapted to rotate at high-speed rotation (e.g. 10000 rpm) or into a magnetic disk device for use in a mobile application, the impact resistance is required for the glass substrate and thus it is preferable that the compressive stress layer be formed on the surfaces of the glass substrate. Herein, the chemical strengthening is a treatment for strengthening a glass substrate by bringing the glass substrate into contact with a chemical strengthening treatment solution containing a chemical strengthening salt to thereby exchange part of ions contained in the glass substrate for ions in the chemical strengthening treatment solution having an ionic radius greater than that of the former ions.

(Magnetic Disk)

Then, by forming a magnetic film on the above-mentioned magnetic disk substrate, it is possible to manufacture a magnetic disk according to this embodiment. Since the magnetic film is formed on the magnetic disk substrate, the shape of a main surface of the magnetic disk is largely affected by the glass substrate. That is, in order to improve the shape of the main surface of the magnetic disk, it is necessary to improve the shape of the main surface of the glass substrate. Therefore, using the magnetic disk substrate disclosed in this embodiment, it is possible to manufacture the magnetic disk improved particularly in shape of a peripheral portion of the main surface. Since a magnetic disk manufacturing method is known, a description thereof is omitted herein.

The magnetic disk according to this embodiment may be a magnetic disk to be mounted in a magnetic disk device of the load/unload type in which a magnetic head is loaded and unloaded with respect to the main surface through its outer periphery. Since the flatness of the outer peripheral portion of the glass substrate is high, the magnetic disk can be suitable for the load/unload type.

The magnetic disk according to this embodiment may be a magnetic disk to be mounted in a magnetic disk device adapted to rotate it at a rotational speed of at least 5400 rpm or more. Further, it can be suitably used even in a magnetic disk device with a speed of 10000 rpm or more. This is because since the flatness of the outer peripheral portion of the glass substrate is high, there is no possibility of contact between the magnetic disk and a magnetic head even in the case of high-speed rotation and thus the reliability is high.

The magnetic disk according to this embodiment may be a contact-sliding type recording medium (contact-recording type recording medium). In the case of the contact-sliding type recording medium, a recording head reads and writes in a state where it is in sliding contact with a magnetic disk and, therefore, by improving the flatness, in the circumferential direction, of particularly the outer peripheral portion of the magnetic disk substrate as described above, it is possible to prevent jumping of the recording head. This makes it possible to improve the signal quality and to prevent damage to the recording head.

(Magnetic Disk Device)

Then, by mounting the above-mentioned magnetic disk, it is possible to form a magnetic disk device (hard disk drive). The magnetic disk device mounted with the above-mentioned magnetic disk substrate is particularly suitable when recording/reproducing information particularly at high-speed rotation.

Although the description is being given centering on the outer peripheral end face of the magnetic disk substrate, an offset portion 14 is also formed with respect to the inner peripheral end face in the manner as described above. It is needless to say that an extreme portion 15 where rising in the offset portion 14 is maximum is preferably located at approximately the same distance from the center of the glass substrate.

(Example)

Hereinbelow, a description will be given of an Example about methods of manufacturing a magnetic disk substrate and a magnetic disk to which this invention is applied. These magnetic disk substrate and magnetic disk are manufactured as a magnetic disk having a predetermined shape, such as a 3.5-inch disk (φ89 mm), a 2.5-inch disk (φ65 mm), a 1.0-inch disk (φ27.4 mm), a 0.8-inch disk (φ21.6 mm), or a 1.8-inch magnetic disk (φ48 mm).

(1) Shaping Process and First Lapping Process

In the magnetic disk substrate manufacturing method according to this Example, first, lapping (grinding) is applied to surfaces of a plate-like glass to obtain a glass base member, then this glass base member is cut, thereby cutting out a glass disk. As the plate-like glass, one of various plate-like glasses can be used. This plate-like glass can be manufactured, for example, by a known manufacturing method, such as a pressing method, a float method, a downdraw method, a redrawing method, or a fusion method, using a molten glass as a material. Among them, if the pressing method is used, the plate-like glass can be manufactured at low cost. As a material property of the plate-like glass, use can be made of an amorphous glass or a glass ceramic (crystallized glass). As a material of the plate-like glass, use can be made of an aluminosilicate glass, a sodalime glass, a borosilicate glass, or the like. Particularly as the amorphous glass, the aluminosilicate glass can be preferably used in terms of capability of being chemically strengthened and capability of providing a magnetic disk substrate excellent in main surface flatness and substrate strength.

In this Example, a molten aluminosilicate glass was molded into a disk shape by direct pressing using upper, lower, and drum molds, thereby obtaining an amorphous plate-like glass. As the aluminosilicate glass, use was made of a glass for chemical strengthening which contains, as main components, $SiO_2$: 58 to 75 wt %, $Al_2O_3$: 5 to 23 wt %, $Li_2O$: 3 to 10 wt %, and $Na_2O$: 4 to 13 wt %.

Then, lapping was applied to both main surfaces of the plate-like glass, thereby obtaining a disk-shaped glass base member. The lapping was carried out using a double-side lapping machine employing a planetary gear mechanism with the use of alumina-based free abrasive grains. Specifically, the lapping was carried out by pressing lapping surface plates onto both surfaces of the plate-like glass from the upper and lower sides, supplying a grinding liquid containing the free abrasive grains onto the main surfaces of the plate-like glass, and relatively moving the plate-like glass and the surface plates to each other. By this lapping, there was obtained the glass base member having the flat main surfaces.

(2) Cutting-Out Process (Coring, Forming, Chamfering)

Then, the glass base member was cut using a diamond cutter, thereby cutting out a disk-shaped glass substrate from the glass base member. Then, using a cylindrical diamond drill, an inner hole was formed at a center portion of the glass substrate, thereby obtaining an annular glass substrate (coring). Then, grinding was applied to an inner peripheral end face and an outer peripheral end face using diamond grindstones, thereby carrying out predetermined chamfering (forming, chamfering).

(3) Second Lapping Process

Then, second lapping was applied to both main surfaces of the obtained glass substrate in the same manner as in the first lapping process. By performing this second lapping process, fine irregularities formed on the main surfaces in the cutting-out process or an end face polishing process as a preceding process can be removed in advance, so that it becomes possible to complete a subsequent main surface polishing process in a short time.

(4) End Face Polishing Process

Then, the outer and inner peripheral end faces of the glass substrate were mirror-polished by a brush polishing method. In this event, as polishing abrasive grains, use was made of a slurry (free abrasive grains) containing cerium oxide abrasive grains.

Then, the glass substrate having been subjected to the end face polishing process was washed with water. By this end face polishing process, the end faces of the glass substrate were finished to a mirror surface state that can prevent precipitation of sodium and potassium.

(5) Main Surface Polishing Process

A first polishing process was first carried out as a main surface polishing process. This first polishing process mainly aims to remove cracks or strains remaining on the main surfaces during the above-mentioned lapping processes. In this first polishing process, the main surfaces were polished using a double-side polishing machine having a planetary gear mechanism with the use of a hard resin polisher. Cerium oxide abrasive grains were used as a polishing liquid.

The glass substrate having been subjected to the first polishing process was immersed in respective cleaning baths of neutral detergent, pure water, and IPA (isopropyl alcohol) in turn so as to be cleaned.

Then, a second polishing process was carried out as a main surface polishing process. This second polishing process aims to finish the main surfaces to a mirror surface state. In this second polishing process, the main surfaces were mirror-polished using a double-side polishing machine having a planetary gear mechanism with the use of a soft resin foam polisher. As a polishing liquid, use was made of cerium oxide abrasive grains finer than the cerium oxide abrasive grains used in the first polishing process.

The glass substrate having been subjected to the second polishing process was immersed in respective cleaning baths of neutral detergent, pure water, and IPA (isopropyl alcohol) in turn so as to be cleaned. An ultrasonic wave was applied to each cleaning bath.

(6) Chemical Strengthening Process

Then, chemical strengthening was applied to the glass substrate having been subjected to the above-mentioned lapping processes and polishing processes. The chemical strengthening was carried out by preparing a chemical strengthening solution in the form of a mixture of potassium nitrate (60%) and sodium nitrate (40%), heating this chemical strengthening solution to 400° C. and preheating the cleaned glass substrate to 300° C., and immersing it in the chemical strengthening solution for about 3 hours. The immersion was carried out in a state where a plurality of glass substrates were placed in a holder so as to be held at their end faces, thereby enabling the entire surfaces of the glass substrates to be chemically strengthened.

By performing the immersion treatment in the chemical strengthening solution as described above, lithium ions and sodium ions in a surface layer of the glass substrate are replaced by sodium ions and potassium ions in the chemical strengthening solution, respectively, so that the glass substrate is strengthened. The thickness of a compressive stress layer formed at the surface layer of the glass substrate was about 100 μm to 200 μm.

The glass substrate having been subjected to the chemical strengthening treatment was immersed in a water bath at 20° C. so as to be rapidly cooled, and maintained for about 10 minutes. Then, the rapidly cooled glass substrate was immersed in concentrated sulfuric acid heated to about 40° C., so as to be cleaned. Further, the glass substrate having been subjected to the sulfuric acid cleaning was immersed in respective cleaning baths of pure water and IPA in turn so as to be cleaned.

By performing the first lapping process, the cutting-out process, the second lapping process, the end face polishing process, the first and second polishing processes, and the chemical strengthening process as described above, there was obtained a flat, smooth, and high-rigidity magnetic-disk substrate.

(7) Inspection Process

An inspection was conducted about the shape of an outer peripheral portion of the obtained magnetic disk substrate. An inspection process comprises a measurement process of measuring offset values and an extreme portion 15 at a plurality of positions in the circumferential direction of the glass substrate and a judgment process of judging whether the glass substrate is good or not based on the measured offset values and extreme portion 15.

(8) Magnetic Disk Manufacturing Process

On each of both surfaces of the glass substrate obtained through the above-mentioned processes, an adhesive layer of a Cr alloy, a soft magnetic layer of a CoTaZr-group alloy, an underlayer of Ru, a perpendicular magnetic recording layer of a CoCrPt-group alloy, a protective layer of hydrocarbon, and a lubricating layer of perfluoropolyether were formed in this order, thereby manufacturing a perpendicular magnetic recording disk. This structure is one example of the structure of a perpendicular magnetic disk (PMR: Perpendicular Magnetic Recording), while, magnetic layers and so on may be formed as a horizontal magnetic disk (LMR: Longitudinal Magnetic Recording). This makes it possible to manufacture a magnetic disk having high-level flatness also at an outer peripheral portion of a main surface thereof.

(9) Magnetic Disk Device Manufacturing Process

By incorporating the above-mentioned magnetic disk into a device, a magnetic disk device was manufactured. Since the structure of a magnetic disk device is known, a detailed description thereof is omitted herein.

Example 3

By applying the following polishing conditions to the second polishing process of (5) Main Surface Polishing Process described above, a magnetic disk substrate, a magnetic disk, and a magnetic disk device were manufactured. In this Example 3, a 2.5-inch disk (φ65 mm) was manufactured. The specific polishing conditions in this Example 3 were such that, like in the case of the above-mentioned Example 1, the hardness of polishing pads was set to 85 (Asker C hardness), the grain size of abrasives to 1.0 (μm), the processing rate to 0.30 (μm/min), and the processing pressure to 9 (Pa). (That is, Example 3 in the second embodiment of this invention was described as Example 1 in the first embodiment of this invention.)

Comparative Example 4

A magnetic disk substrate, a magnetic disk, and a magnetic disk device according to Comparative Example 4 were manufactured by the above-mentioned manufacturing method except that the polishing conditions of the second polishing process were set to the following conditions. The specific polishing conditions in Comparative Example 4 were such that, like in the case of the above-mentioned Comparative Example 2, the processing rate was set to 0.45 (μm/min) and the processing pressure to 8.0 (Pa). (That is, Comparative Example 4 was described as Comparative Example 2 in the first embodiment of this invention.)

Comparison between Example 3 and Comparative Example 4

The shape of an extreme portion 15 present at the periphery of a main surface of each of the magnetic disk substrates manufactured as shown in Example 3 and Comparative Example 4 was inspected by the following method.

(A) Specification of Surface Shape

Figure 6:
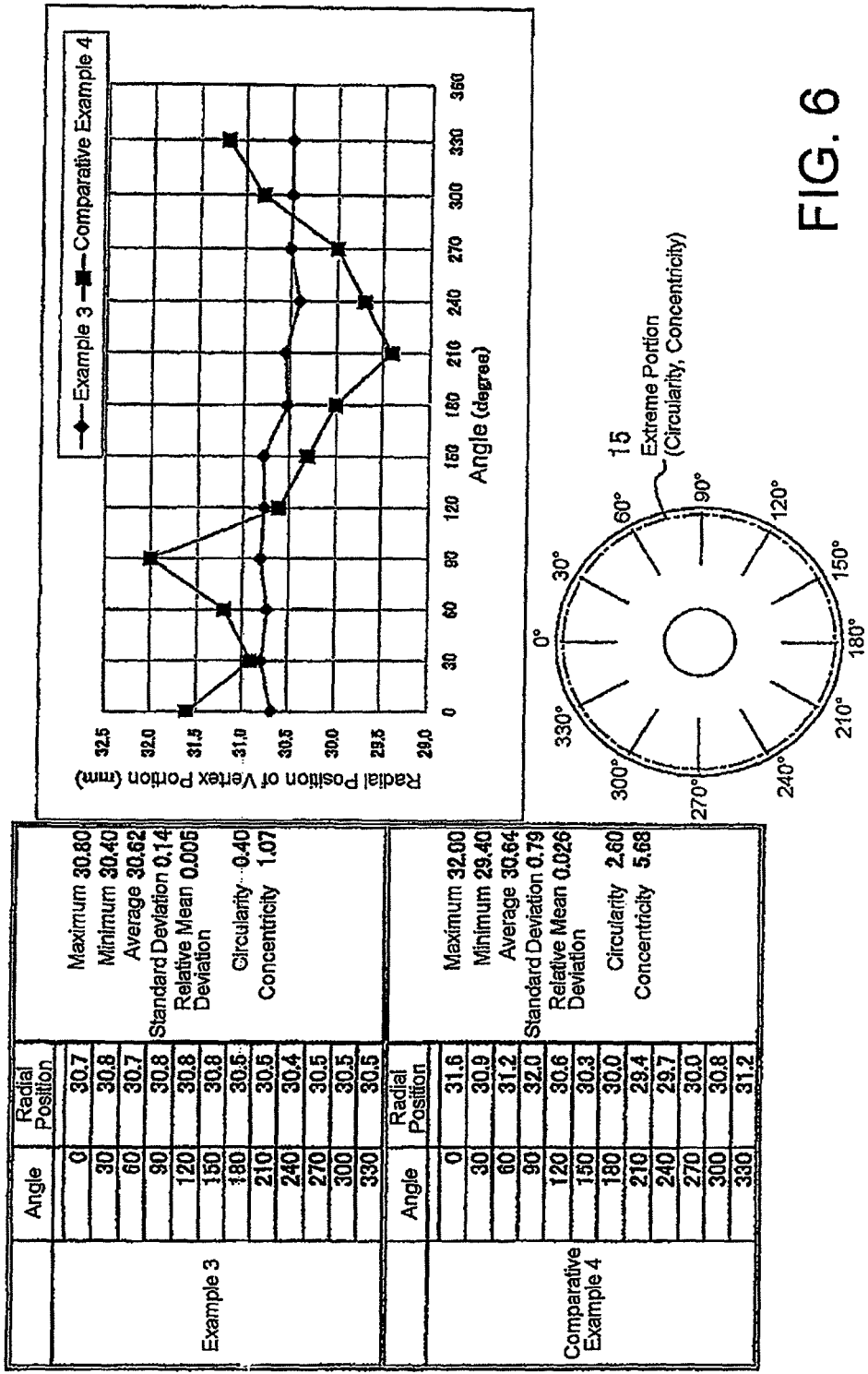
FIG. 6 is a diagram used for explaining a second embodiment of this invention and is a diagram showing the results of measuring the radial position of an extreme portion when the end portion shape of a magnetic disk substrate is a ski-jump shape.

In order to examine the shape (end portion shape) of the periphery of the main surface of the magnetic disk substrate, an optical interference surface shape measuring apparatus (OptiFlat (manufactured by Phase Shift Technology, Inc.)) was used. As a result, it was found that the end portion shape of the glass substrates of Example 3 and Comparative Example 4 was a ski-jump shape. And from this measurement result, the distance of the vertex (extreme portion 15) in the ski-jump shape from the center of the glass substrate was measured. Further, in order to examine the displacement of the position of the vertex in the circumferential direction, the position of the vertex was measured at 12 points in total by rotating the glass substrate per 30° in the circumferential direction. The results in this event are shown in FIG. 6. FIG. 6 is a diagram showing the results of measuring the radial position of the extreme portion (ski-jump point) 15 of the ski jump.

As a result, as shown in FIG. 6, it was found that the extreme portion 15 formed at the periphery of the main surface of the magnetic disk substrate according to Example 3 was located at approximately the same position (distance) as seen from the center of the glass substrate and, specifically, was located in a range of ±0.2 mm with respect to 30.6 mm from the center of the glass substrate. On the other hand, in the case of Comparative Example 4, it was found that the extreme portion 15 was located in a range of ±1.4 mm with respect to 30.6 mm.

The circularity of the magnetic disk substrate according to Example 3 was 0.40 (mm) and the concentricity thereof was 1.07 (mm). On the other hand, the circularity of the magnetic disk substrate according to Comparative Example 4 was 2.60 (mm) and the concentricity thereof was 5.68 (mm). With respect to the height (offset value) of the extreme portion 15, the values were approximately the same in the structures of Example 3 and Comparative Example 4.

(B) Load/Unload Test Comparison

After manufacturing the magnetic disks in which a magnetic layer was formed on the magnetic disk substrates according to Example 3 and Comparative Example 4, the magnetic disk devices were manufactured, and a load/unload test was conducted in which the rotational speed was set to 10000 rpm. In this event, the flying height of a recording head was set to 9 to 10 nm. As a result, no crash occurred even by repeating the load/unload 1000000 times in the case of Example 3, while, in the case of Comparative Example 4, a crash occurred when the load/unload was repeated 600000 times. In Example 3, in the case of a rotational speed of 5400 rpm and 7200 rpm, no crash occurred even by repeating the load/unload 1000000 times.

Further, despite the offset values were approximately the same in Example 3 and Comparative Example 4, a crash failure occurred with the structure of Comparative Example 4 when a glide test was carried out at high-speed rotation. On the other hand, no crash failure occurred with the structure of the Example. This is presumably because even if large (not small) ski jump is present, since the circularity or concentricity is high (value is small), the change (roughness or undulation) of the substrate surface in the circumferential direction is small. Further, as a result of many tests, it was found that the circularity was preferably 600 μm or less and the concentricity was preferably 1200 μm or less.

From this result, it is seen to be important that, as in this invention, the radial position of the extreme portion (vertex of the raised portion) 15 of the offset portion 14 present at the periphery of the main surface of the glass substrate be approximately the same in the circumferential direction.

(C) Influence of End Portion Shape

Next, the influence of the height of the extreme portion 15 in the circumferential direction was examined. An examination was made of the influence of the change in height of the vertex, in the circumferential direction, of the magnetic disk substrate in which the radial position of the extreme portion (vertex of the raised portion) 15 of the offset portion 14 present at the periphery of the main surface of the glass substrate is approximately the same in the circumferential direction (Example 3 described above). Further, another magnetic disk substrate in which the change in height of the vertex in the circumferential direction is greater than that of the above-mentioned Example 3 was prepared as Comparative Example 5. This magnetic disk substrate of Comparative Example 5 was manufactured by setting the processing pressure and the processing rate in the final polishing process to be different from those in the above-mentioned Example 3. Specifically, the magnetic disk substrate of Comparative Example 5 was manufactured by setting the hardness of polishing pads to 85 (Asker C hardness), the grain size of abrasives to 1.0 (μm), the processing rate to 0.60 (μm/min), and the processing pressure to 12.0 (Pa) like in the case of the above-mentioned Comparative Example 1. (That is, Comparative Example 5 was described as Comparative Example 1 in the first embodiment of this invention.)

Then, in order to examine the change in height of each glass substrate in the circumferential direction, the maximum offset value of each substrate between two arbitrary points was measured. Specifically, the measurement range (R1, R2 in FIG. 2) of the maximum offset value was determined so that it was possible to see the change of the extreme portion 15 formed at the periphery of the main surface of the glass substrate and having heights that differ in the circumferential direction. Herein, the distances from the center of the substrate were set to 29.9 mm (R1) and 31.5 mm (R2), respectively, and, as a measuring apparatus, use was made of an optical interference surface shape measuring apparatus (MicroXam (manufactured by Phase Shift Technology, Inc.)). Then, the position of the vertex was measured at 12 points in total by rotating the glass substrate per 30° in the circumferential direction. MicroXam is narrow in measurement range but high in resolution as compared with OptiFlat described above.

That is, the maximum offset value measured by the above-mentioned method represents the magnitude of the offset between the above-mentioned straight line connecting R1 and R2 and the vertex (extreme portion 15) of the above-mentioned raised portion. The results are shown in FIG. 7.

Figure 7:
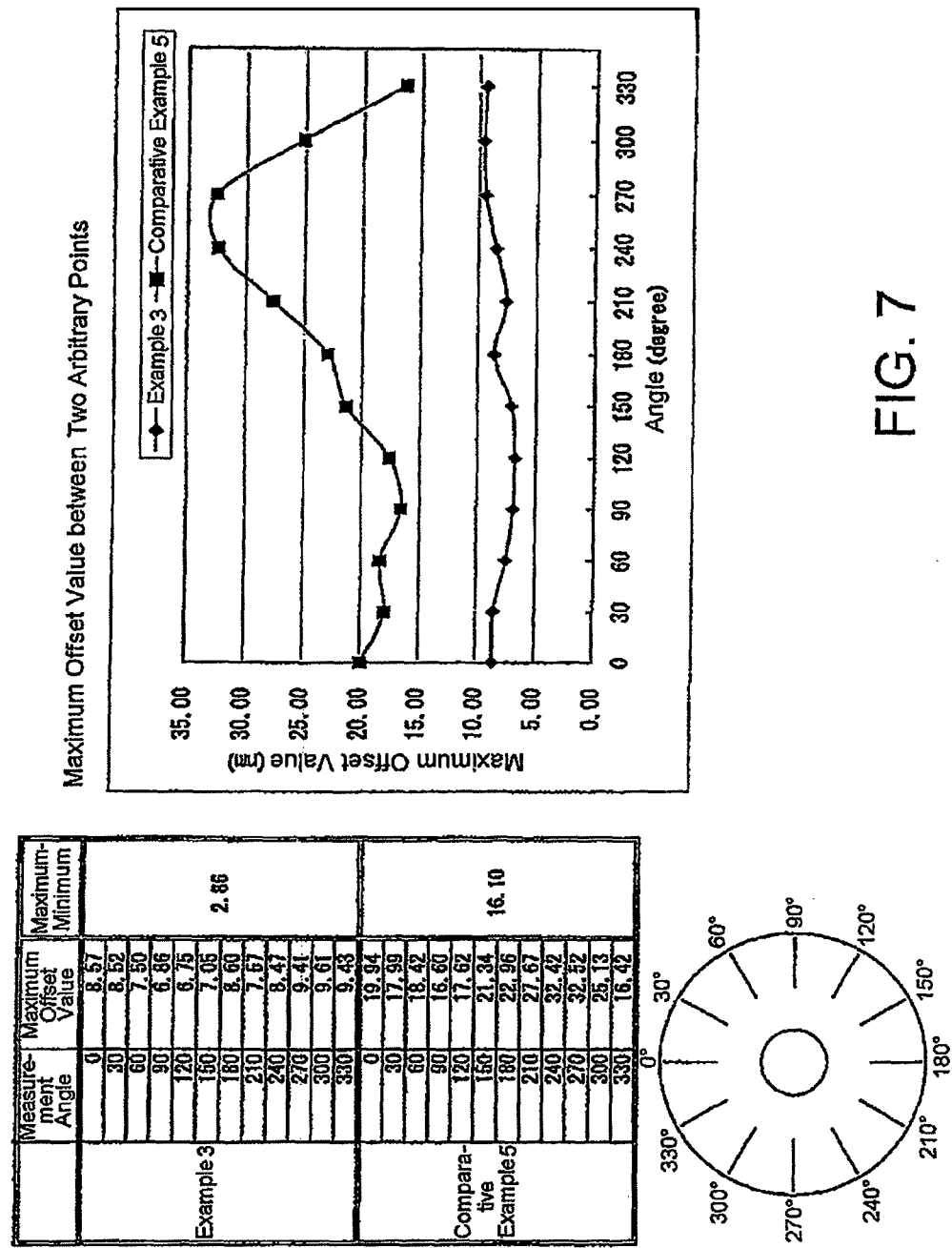
FIG. 7 is a diagram used for explaining a second embodiment of this invention and is a diagram showing the results of measuring the maximum offset value from a straight line connecting two arbitrary points in the end portion shape of a magnetic disk substrate.

As shown in FIG. 7, the change in height of the glass substrate in the circumferential direction is small in Example 3 as compared with that in Comparative Example 5. Specifically, the change difference in Example 3 was 2.86 nm, while, the change difference in Comparative Example 5 was 16.10 nm.

After manufacturing the magnetic disks in which a magnetic layer was formed on the magnetic disk substrates according to Example 3 and Comparative Example 4, the magnetic disk devices were manufactured, and a load/unload test was conducted. Specifically, the test was carried out in two cases with a disk rotational speed of 5400 rpm and 7200 rpm by setting the flying height of a recording head to 9 to 10 nm.

As a result, in the case of the magnetic disks according to Example 3 and Comparative Example 4, no crash occurred even by repeating the load/unload 1000000 times at a rotational speed of 5400 rpm. With respect to the magnetic disk of Comparative Example 5, a crash occurred in a load/unload test of 2000000 times.

From this result, it is seen to be most preferable in terms of rotating the magnetic disk at high speed that the extreme portion 15 be the same in radial position and small in height change in the circumferential direction of the glass substrate.

While the second preferred embodiment of this invention has been described with reference to the accompanying drawings, it is needless to say that this invention is not limited thereto. It is obvious that a person skilled in the art can think of various modified examples or revised examples within the scope described in claims and it is understood that those naturally also belong to the technical scope of this invention.

For example, it has been described in the above-mentioned Example that the substrate according to this invention is a glass (amorphous glass or glass ceramic (crystallized glass) can be used; as a material of a plate-like glass, aluminosilicate glass, sodalime glass, borosilicate glass, or the like). However, since this invention relates to the shape of a substrate, this invention is not limited to a material of the substrate and thus can be suitably applied, for example, even to a substrate made of aluminum or a material other than it. As described above, however, a glass substrate excellent in substrate surface flatness and substrate strength as compared with an aluminum substrate is preferable particularly for a mobile device.

The magnetic disk substrate according to this invention is a magnetic disk substrate having a generally flat main surface, an end face, and a chamfered face formed between the main surface and the end face and may be configured such that, at the periphery of the main surface, there is provided an offset portion 14 raised or lowered with respect to a flat surface, other than the periphery, of the main surface, the offset portion 14 is continuously formed in the circumferential direction of the main surface, and the position of an extreme portion 15 where rising is maximum in the offset portion 14 is located at approximately the same distance from the center of the substrate.

The offset portion 14 may be formed at the outer periphery or the inner periphery of a main surface of a disk-shaped magnetic disk formed with an inner hole in its center or may be formed at each of them. In this invention, when the offset portion 14 is formed at each of the inner periphery and the outer periphery, at least one of the offset portions 14 may have the above-mentioned shape, but it is preferable that particularly the outer periphery where the linear velocity of a recording head is high have the above-mentioned shape.

INDUSTRIAL APPLICABILITY

This invention can be used as a magnetic disk substrate for use in a magnetic recording medium and as a magnetic disk using it.

The invention claimed is:

1. A magnetic disk substrate being a disk-shaped substrate and having a generally flat main surface, an end face, a chamfered face formed between the main surface and the end face, and an offset portion, at a periphery of the main surface, raised with respect to a flat surface, other than the periphery, of the main surface, wherein:
   said offset portion is formed over the entire circumference of said substrate;
   when a distance from a center of the substrate to the end face is 100%, an extreme portion where rising is maximum in the offset portion is located in a range of 92.0 to 97.0% from the center of the substrate;
   in the main surface, a circularity of a circle formed by the extreme portion is 400 μm or less; and
   the substrate is configured to be adapted to a magnetic disk of a load/unload type in which a magnetic head is loaded and unloaded with respect to the main surface of the magnetic disk through its outer periphery.

2. A magnetic disk substrate according to claim 1, wherein:
   said substrate has a circular hole in its center, and
   in said main surface, a concentricity between a circle formed by said extreme portion and said circular hole is 1200 μm or less.

3. A magnetic disk substrate according to claim 1, wherein:
   said offset portion includes rising and/or lowering with respect to the flat surface, other than the periphery, of said main surface, said rising and/or lowering formed at the periphery of said main surface, and
   a magnitude of offset in said offset portion is approximately uniform over the entire circumference of said substrate.

4. A magnetic disk substrate according to claim 3, wherein, in said offset portion, a change in magnitude of said offset is 5 nm or less.

5. A magnetic disk substrate according to claim 1, wherein said substrate is a substrate for use in a magnetic disk to be mounted in a magnetic disk device adapted to rotate the magnetic disk at a rotational speed of at least 5400 rpm or more.

6. A magnetic disk wherein at least a magnetic layer is formed on the substrate according to claim 1.

7. A magnetic disk according to claim 6, wherein the disk is configured to operate together with the magnetic head having a flying height of 4 nm or less.

8. A magnetic disk according to claim 6, wherein a recording density is 200 GBit/inch$^2$ or more.

9. A magnetic disk device mounted with the magnetic disk according to claim 6.

* * * * *